United States Patent [19]

Jardine et al.

[11] Patent Number: 5,884,018
[45] Date of Patent: Mar. 16, 1999

[54] METHOD AND APPARATUS FOR DISTRIBUTED AGREEMENT ON PROCESSOR MEMBERSHIP IN A MULTI-PROCESSOR SYSTEM

[75] Inventors: Robert L. Jardine, Cupertino; Murali Basavaiah, Sunnyvale; Karoor S. Krishnakumar, East San Jose; Srinivasa D. Murthy, San Jose, all of Calif.

[73] Assignee: Tandem Computers Incorporated, Cupertino, Calif.

[21] Appl. No.: 789,257

[22] Filed: Jan. 28, 1997

[51] Int. Cl.$^6$ ...................................................... G06F 11/00
[52] U.S. Cl. ......................................................... 395/182.02
[58] Field of Search ........................ 395/182.02, 182.09, 395/200.03, 200.12; 370/216, 221; 364/229.4, 230.5, 230.6, 268.9, 269.2, 281.9, 281.6

[56] References Cited

U.S. PATENT DOCUMENTS

| | | | |
|---|---|---|---|
| 4,321,666 | 3/1982 | Tasar et al. ............................. | 364/200 |
| 4,323,966 | 4/1982 | Whiteside et al. ...................... | 364/200 |
| 4,356,546 | 10/1982 | Whiteside et al. ...................... | 364/200 |
| 4,718,002 | 1/1988 | Carr ....................................... | 364/200 |
| 4,757,442 | 7/1988 | Sakata ................................... | 364/200 |
| 4,817,091 | 3/1989 | Katzman et al. .......................... | 371/9 |
| 5,301,309 | 4/1994 | Sugano ................................... | 395/575 |
| 5,452,441 | 9/1995 | Esposito et al. .................. | 395/182.11 |
| 5,592,610 | 1/1997 | Chittor ............................... | 395/182.02 |
| 5,687,308 | 11/1997 | Jardine et al. ...................... | 395/182.02 |
| 5,692,119 | 11/1997 | Koguchi et al. .................... | 395/182.02 |

OTHER PUBLICATIONS

Farquhar et al., "Fault Detection and Recovery in a Data-Driven Real-Time Multiprocessor", IEEE, pp. 769-774, Apr. 1994.

*Primary Examiner*—Robert W. Beausoliel, Jr.
*Assistant Examiner*—Stephen C. Elmore
*Attorney, Agent, or Firm*—Robert J. Bennett, Esq.; Townsend & Townsend & Crew

[57] ABSTRACT

An apparatus and protocol to determine the group of processors that will survive communications faults and/or timed-event failures in a multiprocessor system. The processors each have a respective memory, and the processors are coupled by means of an inter-processor communication network. The processors detect that the set of processors with which they can communicate has changed. They can choose to either halt or continue operations based on minimizing the likelihood that disconnected groups of processors will continue to operate as independent systems. The processors construct a connectivity matrix on the initiation of a regroup operation. The connectivity information is used to ensure that all the processors in the final group that survives can communicate with all other processors in the group. One or more processors may halt to achieve this characteristic. A processor is suspected of having ceased operations or having a failed timer mechanism when other processors detect the absence of a periodic message from the processor. When this happens, all of the processors are subjected to a series of stages in which they repeatedly broadcast their status and connectivity to each other. The suspected processor does not advance through the stages if it has ceased operations or if its timer mechanism has failed.

4 Claims, 18 Drawing Sheets

| | |
|---|---|
| i+1 | |
| Power Failure Restart Flag | 1 |
| Old Configuration (Healthy Processors) | 0000 1000 0000 0000 |
| Old Configuration (Healthy Processors) | 0000 0000 0000 0000 |
| | 0000 0000 0000 0000 |
| | 0000 0000 0000 0000 |

*Beginning of Stage 1*

| | |
|---|---|
| Sequence_Number 710 | |
| Power Failure Restart Flag | |
| STAGE 720 | |
| OUTER_SCREEN 730 | |
| INNER_SCREEN 740 | |
| KNOWN_STAGE_1 750a | |
| KNOWN_STAGE_2 750b | |
| KNOWN_STAGE_3 750c | |
| KNOWN_STAGE_4 750d | |

| | |
|---|---|
| i | |
| Power Failure Restart Flag | 5 |
| Old Configuration (Healthy Processors) | xxxx xxxx xxxx xxxx |
| Old Configuration (Healthy Processors) | xxxx xxxx xxxx xxxx |
| | xxxx xxxx xxxx xxxx |
| | xxxx xxxx xxxx xxxx |

*End of Stage 5*

*Figure 9*

| | End of Stage 1 |
|---|---|
| i+1 | |
| Power Failure Restart Flag | |
| 1 | |
| Old Configuration (Healthy Processors) | |
| Old Configuration (Healthy Processors) | |
| 1100 1000 0111 0001 | |
| 0000 0000 0000 0000 | |
| 0000 0000 0000 0000 | |
| 0000 0000 0000 0000 | |

| |
|---|
| Sequence_Number 710 |
| Power Failure Restart Flag |
| STAGE 720 |
| OUTER_SCREEN 730 |
| INNER_SCREEN 740 |
| KNOWN_STAGE_1 750a |
| KNOWN_STAGE_2 750b |
| KNOWN_STAGE_3 750c |
| KNOWN_STAGE_4 750d |

| |
|---|
| i+1 |
| Power Failure Restart Flag |
| 1 |
| Old Configuration (Healthy Processors) |
| Old Configuration (Healthy Processors) |
| 0000 1000 0000 0000 |
| 0000 0000 0000 0000 |
| 0000 0000 0000 0000 |
| 0000 0000 0000 0000 |

*Begginng of Stage 1*

*Figure 10*

| i+1 |
|---|
| Power Failure Restart Flag |
| 2 |
| Old Configuration (Healthy Processors) |
| 1100 1000 0111 1101 |
| 1100 1000 0111 1101 |
| 1100 1000 0111 1101 |
| 0000 0000 0000 0000 |
| 0000 0000 0000 0000 |

*End of Stage 2*

| Sequence_Number 710 |
|---|
| Power Failure Restart Flag |
| STAGE 720 |
| OUTER_SCREEN 730 |
| INNER_SCREEN 740 |
| KNOWN_STAGE_1 750a |
| KNOWN_STAGE_2 750b |
| KNOWN_STAGE_3 750c |
| KNOWN_STAGE_4 750d |

| i+1 |
|---|
| Power Failure Restart Flag |
| 2 |
| Old Configuration (Healthy Processors) |
| 1100 1000 0111 0001 |
| 1100 1000 0111 0001 |
| 0000 1000 0000 0000 |
| 0000 0000 0000 0000 |
| 0000 0000 0000 0000 |

*Beginning of Stage 2*

*Figure 12*

| i+1 | Power Failure Restart Flag | 3 | 1100 1000 0111 1101 | 1100 1000 0111 1101 | 1100 1000 0111 1101 | 1100 1000 0111 1101 | 1100 1000 0111 1101 | 0000 0000 0000 0000 |
|---|---|---|---|---|---|---|---|---|

*End of Stage 3*

| Sequence_Number 710 | Power Failure Restart Flag | STAGE 720 | OUTER_SCREEN 730 | INNER_SCREEN 740 | KNOWN_STAGE_1 750a | KNOWN_STAGE_2 750b | KNOWN_STAGE_3 750c | KNOWN_STAGE_4 750d |
|---|---|---|---|---|---|---|---|---|

*Figure 14*

| i+1 | Power Failure Restart Flag | 3 | 1100 1000 0111 1101 | 1100 1000 0111 1101 | 1100 1000 0111 1101 | 1100 1000 0111 1101 | 0000 1000 0000 0000 | 0000 0000 0000 0000 |
|---|---|---|---|---|---|---|---|---|

*Beginning of Stage 3*

| i+1 |
|---|
| Power Failure Restart Flag |
| 4 |
| 1100 1000 0111 1101 |
| 1100 1000 0111 1101 |
| 1100 1000 0111 1101 |
| 1100 1000 0111 1101 |
| 1100 1000 0111 1101 |
| 0000 1000 0000 0000 |

*Beginning of Stage 4 (after deferred cleanup)*

| |
|---|
| Sequence_Number 710 |
| Power Failure Restart Flag |
| STAGE 720 |
| OUTER_SCREEN 730 |
| INNER_SCREEN 740 |
| KNOWN_STAGE_1 750a |
| KNOWN_STAGE_2 750b |
| KNOWN_STAGE_3 750c |
| KNOWN_STAGE_4 750d |

| i+1 |
|---|
| Power Failure Restart Flag |
| 3 |
| 1100 1000 0111 1101 |
| 1100 1000 0111 1101 |
| 1100 1000 0111 1101 |
| 1100 1000 0111 1101 |
| 1100 1000 0111 1101 |
| 0000 0000 0000 0000 |

*End of Stage 3*

*Figure 15*

| i+1 |
|---|
| Power Failure Restart Flag |
| 4 |
| 1100 1000 0111 1101 |
| 1100 1000 0111 1101 |
| 1100 1000 0111 1101 |
| 1100 1000 0111 1101 |
| 1100 1000 0111 1101 |
| 1100 1000 0111 1101 |

*End of Stage 4*

| Sequence_Number 710 |
|---|
| Power Failure Restart Flag |
| STAGE 720 |
| OUTER_SCREEN 730 |
| INNER_SCREEN 740 |
| KNOWN_STAGE_1 750a |
| KNOWN_STAGE_2 750b |
| KNOWN_STAGE_3 750c |
| KNOWN_STAGE_4 750d |

*Figure 16*

| i+1 |
|---|
| Power Failure Restart Flag |
| 4 |
| 1100 1000 0111 1101 |
| 1100 1000 0111 1101 |
| 1100 1000 0111 1101 |
| 1100 1000 0111 1101 |
| 1100 1000 0111 1101 |
| 0000 1000 0000 0000 |

*Beginning of Stage 4
(after deferred cleanup)*

| | |
|---|---|
| i+1 | |
| Power Failure Restart Flag | |
| 5 | |
| 1100 1000 0111 1101 | |
| 1100 1000 0111 1101 | |
| 1100 1000 0111 1101 | |
| 1100 1000 0111 1101 | |
| 1100 1000 0111 1101 | |
| 1100 1000 0111 1101 | |

*Beginning of Stage 5*

| |
|---|
| Sequence_Number 710 |
| Power Failure Restart Flag |
| STAGE 720 |
| OUTER_SCREEN 730 |
| INNER_SCREEN 740 |
| KNOWN_STAGE_1 750a |
| KNOWN_STAGE_2 750b |
| KNOWN_STAGE_3 750c |
| KNOWN_STAGE_4 750d |

*Figure 17*

| |
|---|
| i+1 |
| Power Failure Restart Flag |
| 4 |
| 1100 1000 0111 1101 |
| 1100 1000 0111 1101 |
| 1100 1000 0111 1101 |
| 1100 1000 0111 1101 |
| 1100 1000 0111 1101 |
| 1100 1000 0111 1101 |

*End of Stage 4*

METHOD AND APPARATUS FOR DISTRIBUTED AGREEMENT ON PROCESSOR MEMBERSHIP IN A MULTI-PROCESSOR SYSTEM

This invention relates generally to fault-tolerant multi-processor systems. In particular, this invention relates to methods for improving the resilience of a multiprocessor system in partial and total communication failure scenarios and in the face of failure of periodic or timed events on a constituent processor.

RELATED PATENT APPLICATIONS

U.S. patent application Ser. No. 08/265,585 entitled, "Method and Apparatus for Fault-Tolerant Multi-processing System Recovery from Power Failure or Drop-Outs," filed Jun. 23, 1994, naming as inventors Robert L. Jardine, Richard M. Collins and Larry D. Reeves, under an obligation of assignment to the assignee of this invention, with Attorney Docket No. 010577-031900/TA 271;

U.S. patent application Ser. No. 08/487,941 entitled, "A Method to Improve Tolerance of Non-Homogeneous Power Outages," filed Jun. 7, 1995, now U.S. Pat. No. 5,687,308, issued Nov. 11, 1997, naming as inventors Robert L. Jardine, Richard M. Collins and A. Richard Zacher, under an obligation of assignment to the assignee of this invention, with Attorney Docket No. 010577-033000/TA 272;

U.S. patent application Ser. No. 08/780,269 entitled, "Method and Apparatus for Split Brain Avoidance in a Multi-Processor System," filed on the same date as the instant application, naming as inventors Robert L. Jardine, Murali Basavaiah and Karoor S. Krishnakumar, under an obligation of assignment to the assignee of this invention, with Attorney Docket No. 010577-035700/TA 333;

U.S. patent application Ser. No. 08/790,030 entitled, "Method and Apparatus for Node Pruning a Multi-Processor System for Maximal, Full Connection During Recovery," filed on the same date as the instant application, naming as inventors Murali Basavaiah and Karoor S. Krishnakumar, under an obligation of assignment to the assignee of this invention, with Attorney Docket No. 010577-040000/TA 333 DIV 1; and U.S. patent application Ser. No. 08/790,268 entitled, "Method and Apparatus for Toleration of Lost Timer Ticks During Recovery of a Multi-Processor System," filed on the same date as the instant application, naming as inventors Murali Basavaiah, Karoor S. Krishnakumar and Srinivasa D. Murthy, under an obligation of assignment to the assignee of this invention, with Attorney Docket No. 010577-039900/TA 333 DIV 2.

BACKGROUND OF THE INVENTION

Distributed, shared-nothing multi-processor architectures and fault-tolerant software using process pairs require that all processors in a system have a consistent image of the processors making up the system. (The NONSTOP KERNEL operating system (NONSTOP and NONSTOP KERNEL is are registered trademarks of Tandem Computers Incorporated), available from the assignee of this application is an example of such fault-tolerant software.) This consistent system image is crucial for maintaining global system tables required for system operation and for preventing data corruption caused by, say, an input/output process pair (IOP) of primary and backup processes on different processors accessing the same I/O device through dual-ported I/O controllers or a shared bus (such as SCSI).

Detection of processor failures occurs quickly with an IamAlive message scheme. Each processor periodically sends IamAlive packets to each of the other processors in the system. Each processor in a system determines whether another processor is operational by timing packets from it. When the time interval passes without receipt of a packet from a given processor, the first processor decides that the second might have failed.

In older systems, before regrouping was implemented, the following could occur when the second processor then sent a packet to the first. The first processor judged the second to be functioning improperly and responded with a poison packet. The first processor ignored the content of the packet from the second.

Ultimately, many or all of the other processors could end up ignoring the affected processor (except to try to stop it). The affected processor was, in effect, outside of the system and functioning as if it were an independent system. This condition was sometimes called the split-brain problem.

Without regrouping, the following situations can occur: Both of the processes in a process pair running on different processors can regard themselves as the primary, destroying the ability to perform backup functions and possibly corrupting files. All system processors can become trapped in infinite loops, contending for common resources. System tables can become corrupted.

Regrouping supplements the IamAlive/poison packet method. Regrouping uses a voting algorithm to determine the true state of each processor in the system. Each processor volunteers its record of the state of all other processors, compares its record with records from other processors and updates its record accordingly. When the voting is complete, all processors have the same record of the system's state. The processors will have coordinated among themselves to reintegrate functional but previously isolated processors and to correctly identify and isolate nonfunctional processors.

Regrouping works only when physical communication among processors remains possible, regardless of the logical state of the processors. If a processor loses all of its communications paths with other processors, that processor cannot be regrouped. It remains isolated until communications are restored and the system is cold loaded. (Such a processor usually stops itself because its self-checking code cannot send and receive message system packets to and from itself.)

A processor's logical state and its condition are distinguished. A processor has two logical states in a properly configured system: up or down. However, a processor has three conditions: dead, which is the same as the down logical state; healthy, which is the same as the up logical state; and malatose, which is described further below.

A processor is dead if it does not communicate with the rest of the system. Dead processors include those, for example, that execute a HALT or a system freeze instruction, that encounter-low-level self-check errors such as internal register parity errors, that execute infinite loops with all interrupts disabled, that execute non-terminating instructions due to data corruption or that are in a reset state.

Dead processors are harmless, but the regrouping algorithm removes them from the system configuration. Other processors detect dead processors and declare them down.

A processor is healthy if it is running its operating system (preferably, the NONSTOP KERNEL® operating system available from the assignee of the instant application) and can exchange packets with other processors (preferably, over a redundant high-speed bus or switching fabric) within a reasonable time. The regrouping algorithm prevents a processor declaring down a healthy processor.

A malatose processor is neither dead nor healthy. Such a processor either is not responding in a timely manner (perhaps because of missing timer ticks) or is temporarily frozen in some low-level activity. A malatose processor might be, for example, flooded with highest-priority interrupts such that the processor cannot take lower-priority interrupts or might be flooded with lower-priority interrupts such that the processor falls behind in issuing IamAlive packets. A malatose processor might be waiting for a faulty hardware device on which the clocks have stopped or might be running too long with interrupts disabled by the mutual exclusion mechanism.

The regrouping algorithm detects a malatose processor and forces it to become either healthy or dead, that is to say, either up or down. Correspondingly, a processor halts itself when another processor that it has not declared down declares it down.

With regard to regrouping, each processor in the system is either stable (that is, waiting for the need to act) or perturbed, including several states described below.

While a processor is stable, the IamAlive message scheme continues to operate. If a predetermined amount of time, say, 2.4 seconds, passes without an IamAlive message from another processor, the processor becomes perturbed.

While perturbed, a processor exchanges specially marked packets with other perturbed processors to determine the current processor configuration of the system. When that configuration is agreed upon, the processor becomes stable again.

Processors spend most of their time stable.

A regrouping incident begins when a processor becomes perturbed and ends when all processors become stable again. Each regrouping incident has a sequence number that is the number of regrouping incidents since the last system cold load.

Each processor also maintains variables to store two configurations, one old and one new. While a processor is stable, bit-map variables called OUTER_SCREEN and INNER_SCREEN both contain the old configuration.

While a processor is stable, it knows that every processor in the old configuration is up and every processor not in the old configuration is down. Each processor in the old configuration has the same regrouping sequence number.

While a processor is perturbed, it broadcasts its view of the configuration (and its own status) on its busses or fabrics. It sends this view periodically, for example, every 0.3 seconds, to all other processors in the old configuration. Receiving such a broadcast perturbs any stable processor in the configuration.

The four stages of the regrouping protocol described further below make all perturbed processors create the same view of the system configuration. When regrouping completes, all processors in the system are stable and contain the same new configuration. Also, every processor in the new configuration has the same regroup sequence number that is greater than the number in the old configuration.

The new configuration contains no processor that was not in the old configuration. All processors that remained healthy throughout the incident are in the new configuration.

Any processor that was dead when the incident began or that became dead during the incident is not in the new configuration. Regrouping restarts if a processor becomes dead during an incident.

Correspondingly, processors that were malatose when the incident began are in the new configuration as healthy processors if they participated in the complete incident.

The regrouping method ensures that all processors in the new configuration have included and excluded the same processors.

Processor Stages of Pre-Existing Regroup

Each processor regrouping according to the pre-existing algorithm maintains an EVENT_HANDLER( ) procedure and a data structure herein termed the regroup control template #_700 shown in FIG. No. _7. A variable herein termed SEQUENCE_NUMBER contains the current regroup sequence number.

Each processor passes through the following stages while running: Stage 0, Stage 5 and Stages 1 through 4. Stage 0 is a special stage defined in the process control block at system generation. Stage 5 is the stable state described above. Stages 1 through 4 together make up the perturbed state also described above.

A processor maintains the current stage in the variable STAGE. Also, the processor maintains the variables KNOWN_STAGE_1 through KNOWN_STAGE_4 for each of Stages 1 through 4, respectively. Each of these variables is a bit mask that records the processor numbers of all processors known to the maintaining processor to be participating in a regroup incident in the stage corresponding to the variable.

A processor enters Stage 0 when it is cold loaded. While it is in Stage 0, the processor does not participate in any regrouping incident. Any attempt to perturb the processor in this state halts the processor. The processor remains in Stage 0 until its integration into the inter-process and inter-processor message system is complete. Then the processor enters Stage 5. FIGS. No. _8A and No. _8B summarize subsequent actions.

A regrouping incident normally begins when a processor fails to send an IamAlive packet in time, step #_810. This failure perturbs the processor that detects the failure.

When a processor is perturbed, step #_805, it enters Stage 1. Stage 1 synchronizes all participating processors as part of the same regrouping incident, step #_830. Because a new incident can start before an older one is finished, a method is needed to ensure that the participating processors process only the latest incident.

FIG. No. _9 summarizes the transition from Stage 5 to Stage 1. The processor increments the SEQUENCE_NUMBER #_710, sets the Stage #_720 to 1, sets the KNOWN_STAGE_n variables to zero, and then sets its own bit in KNOWN_STAGE_1 #_750a to 1. (The processor does not yet know which processors other than itself are healthy.)

The message system awakens the processor periodically, every 0.3 seconds in one embodiment, so the processor can make three to six attempts to receive acceptable input. More than three attempts occur if more than one processor in the old configuration remains unrecognized, if a power up has occurred, or if the algorithm was restarted as a new incident.

When awakened, the processor broadcasts its status to the old configuration of processors, step #_830. Its status includes its regroup control template #_700.

Typically, status packets from other perturbed processors eventually arrive. If a packet arrives from a processor that was not in the old configuration as defined by the OUTER_SCREEN #_730, this processor ignores the packet and responds with a poison packet.

For a packet that it does not ignore, the processor compares the sequence number in the packet with the SEQUENCE_NUMBER #_710. If the packet sequence number is lower, then the sender is not participating in the current incident. Other data in the packet is not current and is ignored. The processor sends a new status packet to that processor to synchronize it to make it participate in the current incident.

If the sequence number in the packet is higher than the SEQUENCE_NUMBER #_710, then a new incident has started. The SEQUENCE_NUMBER #_710 is set to the sequence number in the packet. The processor reinitializes its data structures and accepts the rest of the packet data.

If the sequence number in the packet is the same as the SEQUENCE_NUMBER #_710, then the processor simply accepts the packet data. Accepting the data consists of logically OR-ing the KNOWN_STAGE_n fields in the packet with the corresponding processor variables #_750 to merge the two processors' knowledge into one configuration.

Stage 1 ends in either of two ways. First, all processors account for themselves. That is to say, when a processor notices that its KNOWN_STAGE_1 variable #_750a includes all processors previously known (that is, equals the OUTER_SCREEN #_730), then the processor goes to Stage 2. However, in the event of processor failure(s), the processors never all account for themselves. Therefore, Stage 1 ends on a time out. The time limit is different for cautious and non-cautious modes, but the processor proceeds to Stage 2 when that time expires—whether all processors have accounted for themselves or not.

FIG. No. _10 summarizes the transition from the beginning of Stage 1 to the end of Stage 1. At the end of Stage 1, KNOWN_STAGE_1 #_750a identifies those processors that this processor recognizes as valid processors with which to communicate during the current incident. In later stages, the processor accepts packets only from recognized processors.

Stage 2 builds the new configuration by adding to the set of processors recognized by the processor all of those processors recognized by recognized processors, step #_850. In effect, the new configuration is a consensus among communicating peers.

FIG. No. _11 summarizes conditions at the beginning of Stage 2. The processor sets the Stage #_720 to 2, records its status in KNOWN_STAGE_2, and copies KNOWN_STAGE_1 to the INNER_SCREEN #_740. The processor continues checking for input and broadcasting status periodically, testing incoming packets for acceptance against the OUTER_SCREEN and INNER_SCREEN #_730, #_740, step #_850.

Packets from old-configuration processors that did not participate in Stage I are identified by the INNER_SCREEN #_740 and ignored. Packets from recognized processors are accepted, and their configuration data is merged into the KNOWN_STAGE_n variables. When a packet from a recognized processor identifies a previously unrecognized processor, the new processor is also added to the INNER_SCREEN #_740. Malatose processors that may have been too slow to join the current regroup incident in Stage 1 can thus still join in Stage 2.

When KNOWN_STAGE_2 #_750b becomes equal to KNOWN_STAGE_1 #_750a, no further changes to the configuration can occur. FIG. No. _12 summarizes conditions at the end of Stage 2. Stage 3 now begins.

At the beginning of Stage 3, as shown in FIG. #_13, the processor increments the Stage #_720 and copies the new configuration to both the INNER_SCREEN and the OUTER_SCREEN #_740, #_730. A malatose processor can no longer join the new configuration as a healthy processor.

Message-system cleanup, step #_860, is performed as follows: The processors in the new configuration shut off the message system to any processor not in the new configuration. They discard any outstanding transmissions to any excluded processor and discard any incoming transmissions from it. Inter-processor traffic queues are searched for messages queued from requesters/linkers in the excluded processor but not canceled. Any uncanceled messages found are discarded. Inter-processor traffic queues are searched for messages queued from servers/listeners in the excluded processor but not canceled. Any uncanceled messages found are attached to a deferred cancellation queue for processing during Stage 4.

This cleanup ensures that no message exchanges begun by a server/listener application in a processor in the new configuration remain unresolved because of exclusion of the other processor from the new configuration. All messages that could be sent to the excluded processor have been sent; and all messages that could be received from it have been received.

Most processor functions occur as bus or timer interrupt handler actions. Because some cleanup activities take a long time, they cannot be done with interrupts disabled. Instead, those activities are separated from others for the same stage and deferred.

The deferred cleanup is done through a message-system SEND_QUEUED_MESSAGES procedure that is invoked by the dispatcher (the process scheduler). The deferred activities are then performed with interrupts other than the dispatcher interrupt enabled most of the time.

Periodic checking for input and the broadcasting of status continues. When the deferred cleanup mentioned earlier finishes, the processor records its status in KNOWN_STAGE_3 #_750c.

Packets that make it past the INNER_SCREEN and the OUTER_SCREEN #_740, #_730 are merged into the KNOWN_STAGE_n variables #_750. When KNOWN_STAGE_3 #_750c equals KNOWN_STAGE_2 #_750b, all processors in the new configuration have completed similar cleanup and are all in Stage 3. FIG. #_14 summarizes conditions at the end of Stage 3.

In Stage 4, the processor completes the cleanup actions of Stage 3 and notifies processes that one or more processor failures have occurred, step #_870. The processor increments the Stage #_720 to 4 and does the following: sets processor-status variables to show excluded processors in the down state; changes the locker processor, if necessary, for use in the GLUP protocol as described herein; processes messages deferred from Stage 3; manipulates I/O controller tables when necessary to acquire ownership; and notifies requesters/linkers.

Stage 4 is the first point at which failure of another processor can be known by message-system users in the current processor. This delay prevents other processes from beginning activities that might produce incorrect results because of uncanceled message exchanges with the failed processor.

The regrouping processor continues to check for input and to broadcast status, step #_870. When the deferred cleanup finishes, the processor records its status in KNOWN_STAGE_4 #_750d. FIG. No. _15 shows this action.

Packets that make it past the INNER_SCREEN and the OUTER_SCREEN #_740, #_730 are merged into the KNOWN_STAGE_n variables #_750. When KNOWN_STAGE_4 #_750d equals KNOWN_STAGE_3 #_750c, all processors in the new configuration have completed similar cleanup and are all in Stage 4. FIG. #_16 summarizes conditions at the end of Stage 4.

At the beginning of Stage 5, the Stage #_720 becomes 5. One final broadcast and update occur. The OUTER_SCREEN #_730 contains what has now become the old configuration for the next regrouping incident. FIG. #_17 shows this situation.

Finally, higher-level operating system cleanup can now begin. Global update recovery starts in the locker processor.

The processor does its own cleanup processing. Attempts to restart the failed processor can now begin.

Stoping and Restarting an Incident

A processor must complete Stages 2 through 4 within a predetermined time, 3 seconds in one embodiment. If it does not complete those stages within that time, some other processor has probably failed during the regrouping. Therefore, the incident stops and a new incident starts with the processor returning to the beginning of Stage 1. Any cleanup that remains incomplete at the restart completes during the stages of the new incident. Cleanup actions either have no sequencing requirements or have explicitly controlled sequences so that they are unaffected by a restart of the algorithm.

During the restart, the INNER_SCREEN and the OUTER_SCREEN #_740, #_730 are not reinitialized. By not changing these variables, the processor continues to exclude from the new configuration any processors that have already been diagnosed as not healthy. Processors known to be dead are excluded by the OUTER_SCREEN #_740. Processors previously recognized as healthy are the only ones with which the INNER_SCREEN #_730 permits the processor to communicate.

The processor accepts status only from recognized processors. Therefore, only a recognized processor can add another processor to the configuration before the end of Stage 2. As Stage 2 ends and Stage 3 begins, the regrouping processors exclude the failing processor that caused the restart from the new configuration when the KNOWN_STAGE_2 #_750b is copied to the OUTER_SCREEN and INNER_SCREEN #_740, #_730. After Stage 2 ends, the configuration does not change until a new incident starts.

Power Failure and Recovery Regrouping

When a processor is powered up, it causes a new incident to start. A word in a broadcast status packet indicates that a power failure occurred so that receiving processors can clear bus error counters and refrain from shutting down the repowered processor's access to the busses or fabric. Depending on the characteristics of the inter-processor communications hardware (busses or fabrics), errors are more likely just after a power outage when components are powering on at slightly different times.

Effects of Inter-Processor Communications Path Failures

The effect on regrouping of a failure of inter-processor communications paths (IPCPs) depends on whether the failure is transient or permanent. A transient failure is one that allows occasional use of the IPCPs to transmit packets. A permanent failure is one that prevents any packet from passing through that component until the component is replaced.

Transient IPCP failures during Stage 1 normally do not affect regrouping. More than one attempt is made to transmit a status packet, and redundant communications paths are used for each packet. Transmission is almost always successful. If transmission on the redundant paths does fail, either the algorithm restarts or the processor stops.

A successfully transmitted packet can be received as one of three types: unique, because a transient IPCP failure occurred and the other copy of the packet could not be sent; duplicated, because it was received over redundant IPCPs; or obsolete, because a processor transmitted a status packet, had its status change, and then transmitted a new status packet, but one or more paths delivered the status packets out of order.

The regroup control template variables are updated by setting bits to 1 but never by setting them to 0. Duplicated, obsolete, or lost packets do not change the accuracy of the new configuration because a bit is not cleared by subsequent updates until a new incident starts. No harm follows from receiving packets out of order.

The handling of permanent IPCP failures differs. When a processor cannot communicate with itself over at least one path, that processor halts with an error. This action means that when all redundant IPCPs fail, the system halts all processors automatically. Regrouping becomes irrelevant.

Failure of an IPCP element or IPCP-access element does not affect regrouping as long as one two-way communication path remains between two processors. A processor that cannot communicate with at least one other processor halts itself through the monitoring function of the regrouping processor.

A processor that can communicate with at least one other processor is included in the new configuration because the new configuration is achieved by consensus. When each processor receives a status packet, it adds the reported configuration to update its own status records. This combined configuration is automatically forwarded to the next processor to receive a status packet from the updating processor.

For example, consider the following situation: Given redundant IPCPs X and Y, processors 0 and 2 can send only on IPCP X and receive only on IPCP Y. Processor 1, on the other hand, can receive only on IPCP X and send only on IPCP Y. Thus, processors 0 and 2 have a communication path with processor 1. Eventually, all three processors will have the same new configuration. The processor status information from both processors 0 and 2 will have been relayed through processor 1.

Unresolved Failure Scenarios

The pre-existing regroup algorithm works well for processor failures and malatose processors. There are, however, certain communications failure scenarios for which it does not work well. In understanding these scenarios, conceive of a working multi-processing system (such as a NONSTOP KERNEL® operating system) logically as a connected graph in which a vertex represents a functioning processor and an edge represents the ability for two processors to communicate directly with each other. For a system to operate normally, the graph must be fully connected, i.e., all processors can communicate directly with all other processors. A logical connection must exist between every pair of processors.

(The graph is a logical interconnection model. The physical interconnect can be a variety of different topologies, including a shared bus in which different physical interconnections do not exist between every pair of processors.)

In the first scenario, two processors in the system come to have inconsistent views of the processors operating in the system. They disagree about the set of vertices composing the graph of the system. A "split brain" situation is said to have occurred. This split-brain situation can lead each of the primary and backup of an I/O process pair that resides across the split brain to believe that it is the primary process, with data corruption as a result.

Generally, split-brain situations can occur if communication failures break-up a system into two or more distinct clusters of processors, which are cut off from one another.

The connectivity graph of the system then breaks into two or more disjoint connected graphs.

In the second scenario, communication failures result in the connectivity graph becoming only partially connected. This happens when communication between a pair of processors fails completely in spite of redundant paths. When one of the processors notices that it has not received IamAlive messages from the other for a certain period, it activates a regroup operation. If, however, there is a third processor with which the two can communicate, the pre-existing regroup operation decides that all processors are healthy and terminates without taking any action. A message originating on either of the processors and destined to the other processor hangs forever: Both processors are healthy, and a fault-tolerant message system guarantees that messages will be delivered unless the destination processor or process is down. Until a regroup operation declares the destination processor down, the message system keeps retrying the message but makes no progress since there is no communication path between the processors.

In this second scenario, the whole system can hang due to one or more of the following circumstances: The global update (GLUP) protocol (described in U.S. Pat. No. 4,718, 002 (1988), incorporated herein by reference) that is used for is updating the replicated kernel tables assumes that a processor can communicate with all healthy processors in the system. If GLUP starts on a processor that cannot communicate with one of the healthy processors, the GLUP protocol hangs in the whole system, preventing the completion of activities such as named process creation and deletion. A system may also hang if a critical system process hangs waiting for the completion of a hung message.

Such system hangs could lead to processors halting due to the message system running out of resources.

Where the inter-processor communication path is fault-tolerant (e.g., dual buses) while the processors are fail-fast (e.g., single fault-detecting processors or lock-stepped processors running the same code stream, where a processor halts immediately upon detecting a self-fault), the likelihood of communication breakdown between a pair of processors becomes far less likely than the failure of a processor. However, a software policy of downing single paths due to errors increases the probability of this scenario.

Further, with the introduction of complex cluster multi-processor topologies, connectivity failure scenarios seem more likely. These could be the result of failures of routers, defects in the system software, operator errors, etc.

In the third scenario, a processor becomes unable to send the periodic IamAlive messages but nonetheless can receive and send inter-processor communication messages. (Such a situation results from, for example, corruption of the time list preventing the reporting of timer expirations to the operating system.) One of the other processor readily detects this failure of the processor and starts a regroup incident. However, since the apparently malatose processor can receive the regroup packets and can broadcast regroup packets, the faulty processor fully participates in the regroup incident. This participation is sufficient to convince the other processors that the apparently malatose processor is in fact healthy. The processors quickly dub the regroup incident a false start and declare no processors down. A new regroup incident nonetheless starts the next time a processor detects the missing IamAlives. Thus, the system goes through periodic regroup events at the IamAlive-checking frequency (e.g., once per 2.4 seconds), which terminate almost immediately without detecting the failure.

Accordingly, there is a need for a multi-processor regroup operation that avoids these split-brain, partial-connection and timer-failure scenarios.

A goal of the present invention is a multi-processor computer system wherein the constituent processors maintain a consistent image of the processors composing the system.

Yet another goal of the present invention is a multiprocessor computer system wherein the constituent processors are fully connected when the system is stable.

Yet another object of the present invention is a multiprocessor computer system wherein the failure of the processor to receive timer expirations is detected and the processor declared down.

Another goal of the present invention is such a multi-processor system, where said processors are maximally fully connected when the system is stable.

An object of the invention is such a multi-processor system, where the system resources (particularly, processors) that may be needed for meeting integrity and connectivity requirements are minimally excluded.

Another object of the invention is such a multiprocessor system where, when regrouping, the system takes into account any momentarily unresponsive processor.

These and other goals of the invention will be readily apparent to one of ordinary skill in the art on the reading of the background above and the description following.

SUMMARY OF THE INVENTION

Herein is disclosed an apparatus and protocol to determine the group of processors that will survive communications faults and/or timed-event failures in a multiprocessor system. The processors each have a respective memory, and the processors are coupled by means of an inter-processor communication network.

The processors detect that the set of processors with which they can communicate has changed. They then choose to either halt or continue operations based on minimizing the likelihood that disconnected groups of processors will continue to operate as independent systems. The processors construct a connectivity matrix on the initiation of a regroup operation. The connectivity information is used to ensure that all the processors in the final group that survives can communicate with all other processors in the group. One or more processors may halt to achieve this characteristic.

A processor is suspected of having ceased operations or having a failed timer mechanism when other processors detect the absence of a periodic message from the processor. When this happens, all of the processors are subjected to a series of stages in which they repeatedly broadcast their status and connectivity to each other. The suspected processor does not advance through the stages if has ceased operations or if its timer mechanism has failed.

BRIEF DESCRIPTION OF THE DRAWINGS

FIG. #_1 is a simplified block diagram of a multi-processor system incorporating the present invention.

Figure 1:
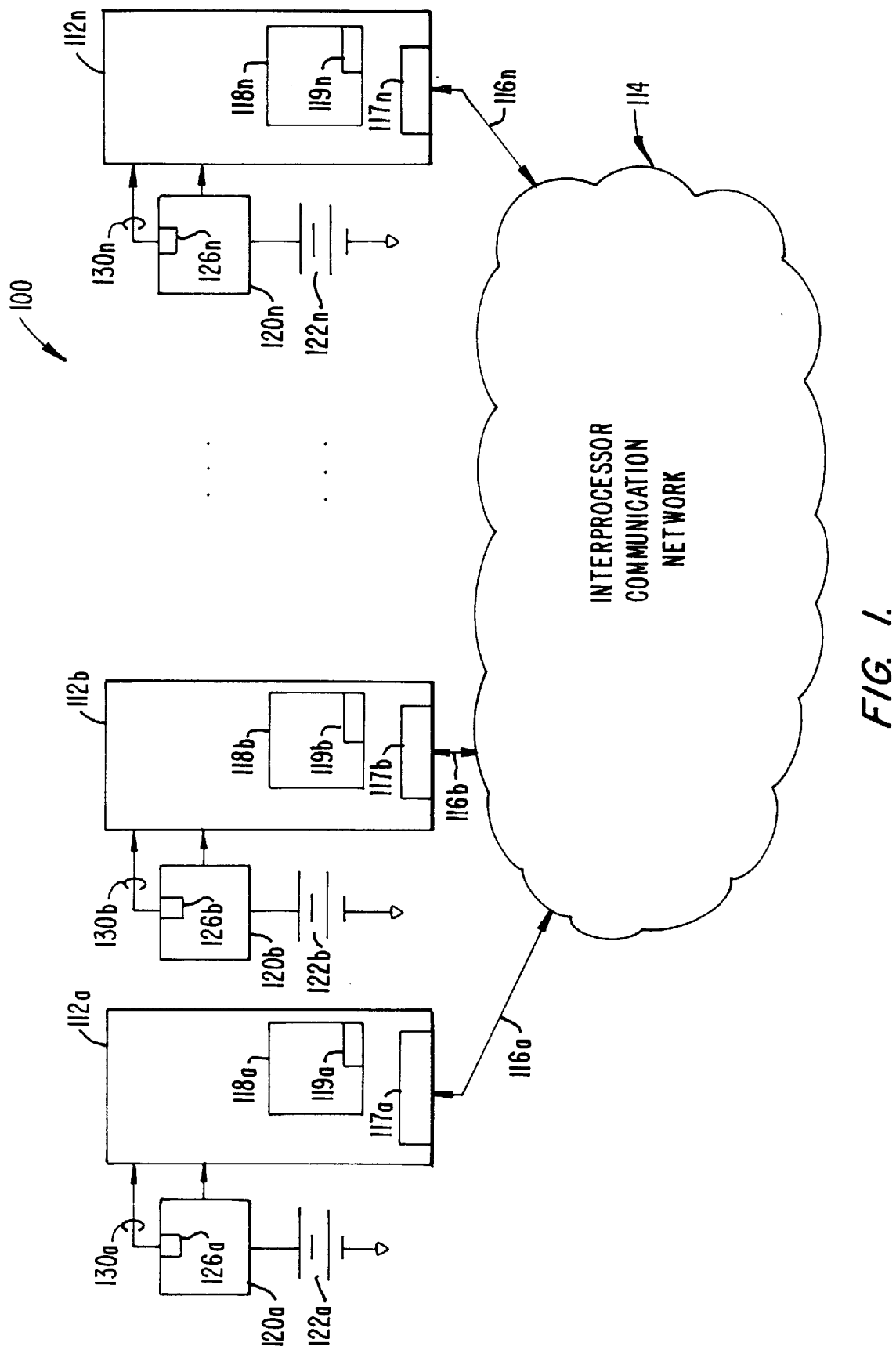
Figure 2:
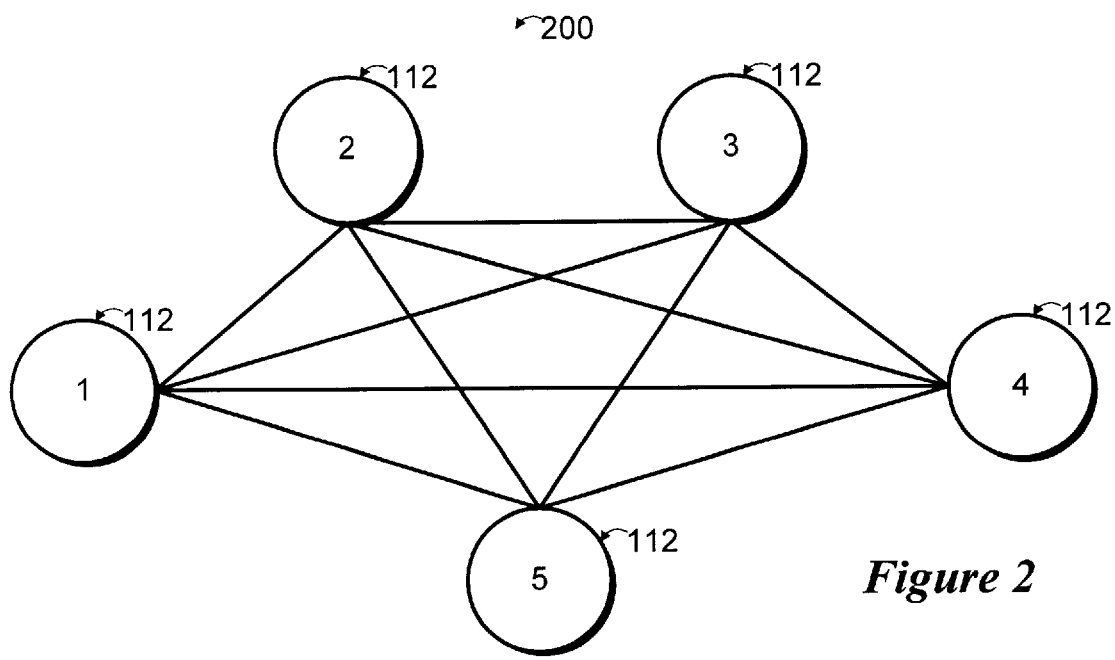
FIGS. 2, 3, 4, and 5 are graphs representing various multi-processor configurations.
Figure 4:
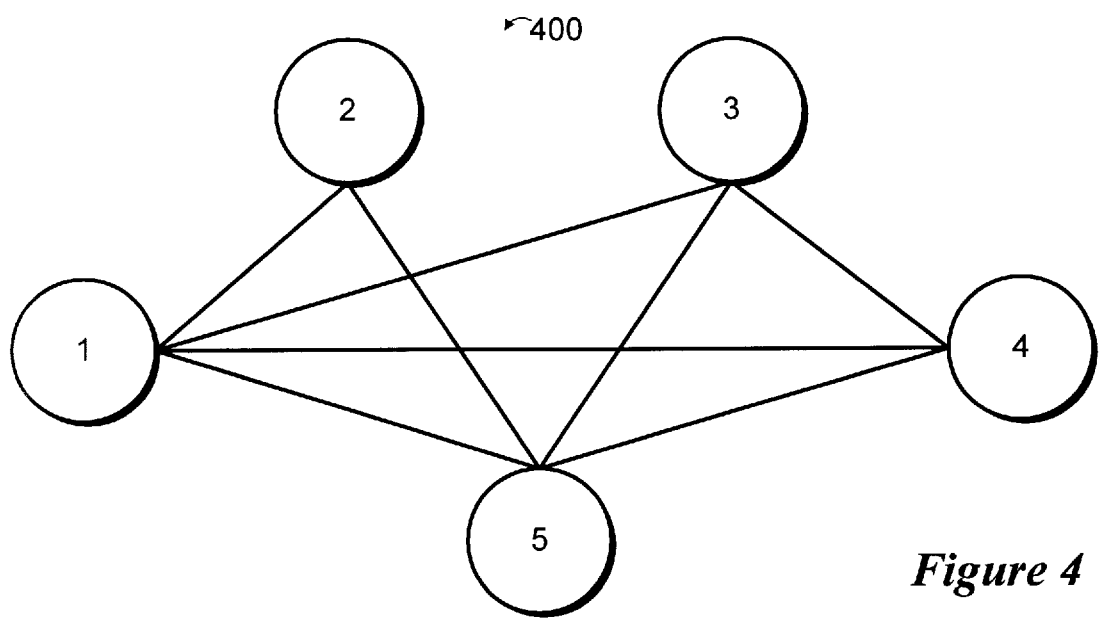
Figure 3:
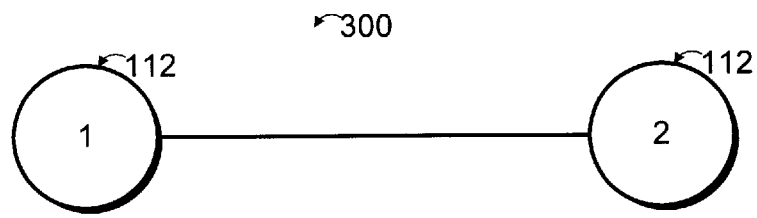
Figure 5:
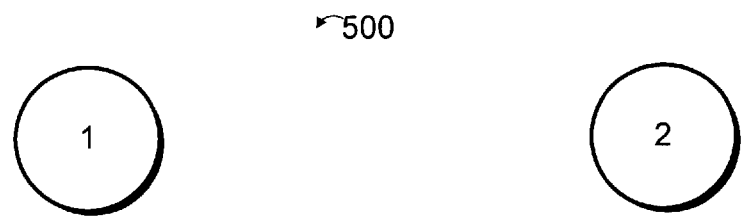
Figure 6:
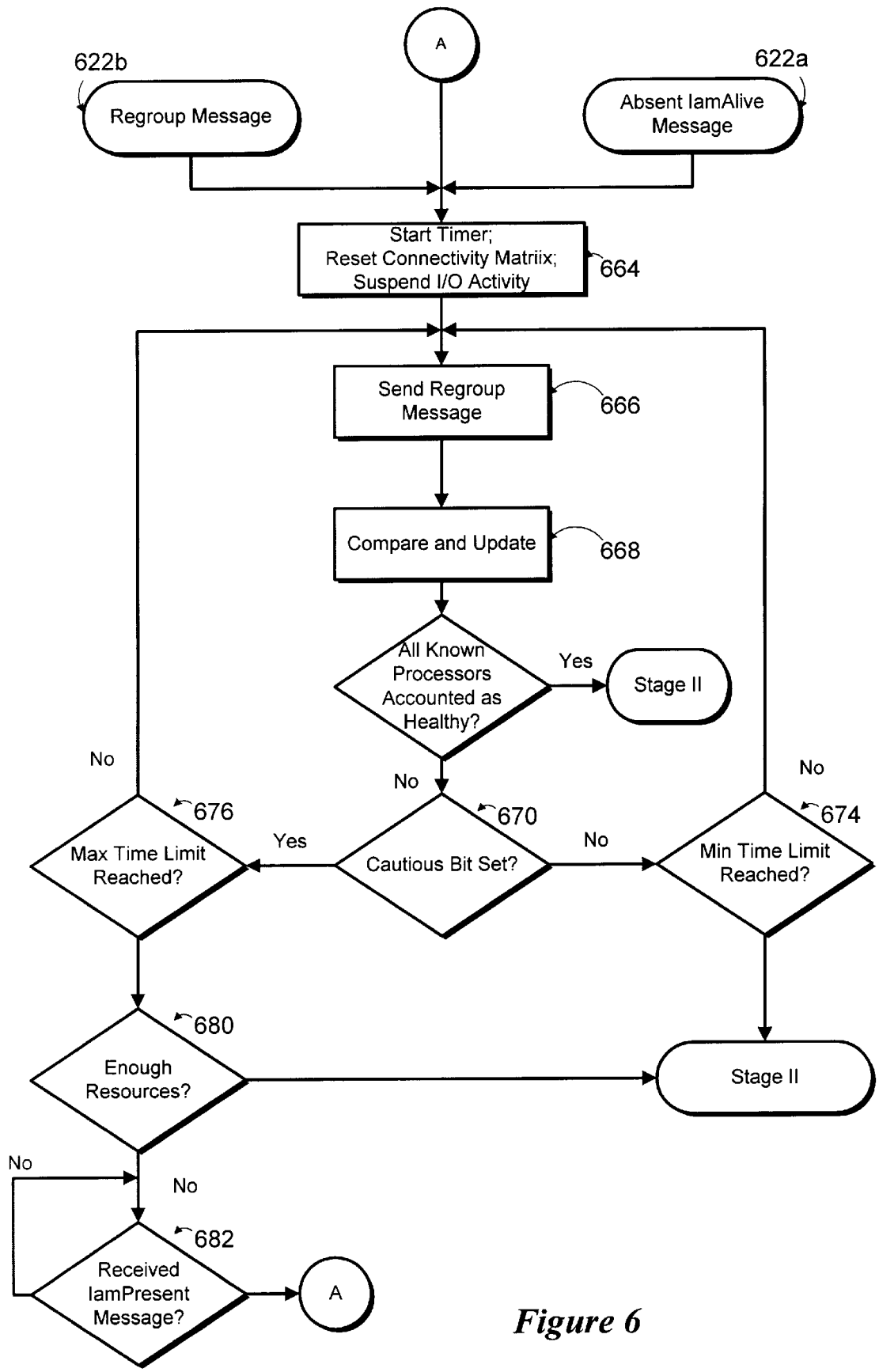
Figure 7:
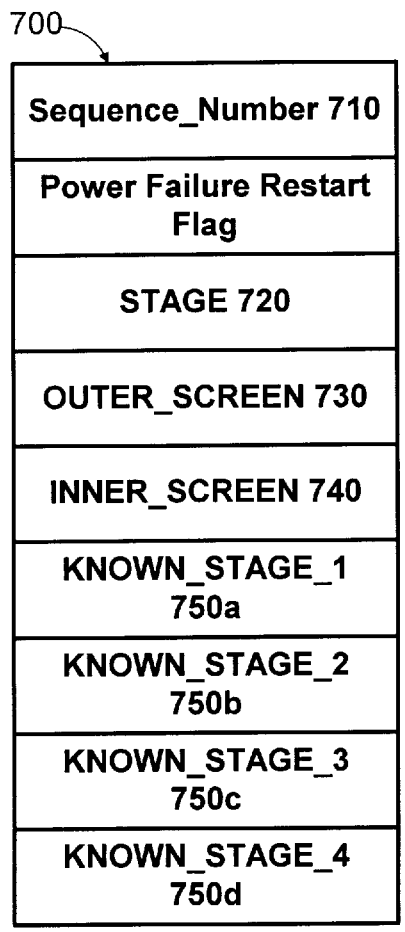
Figure 8A:
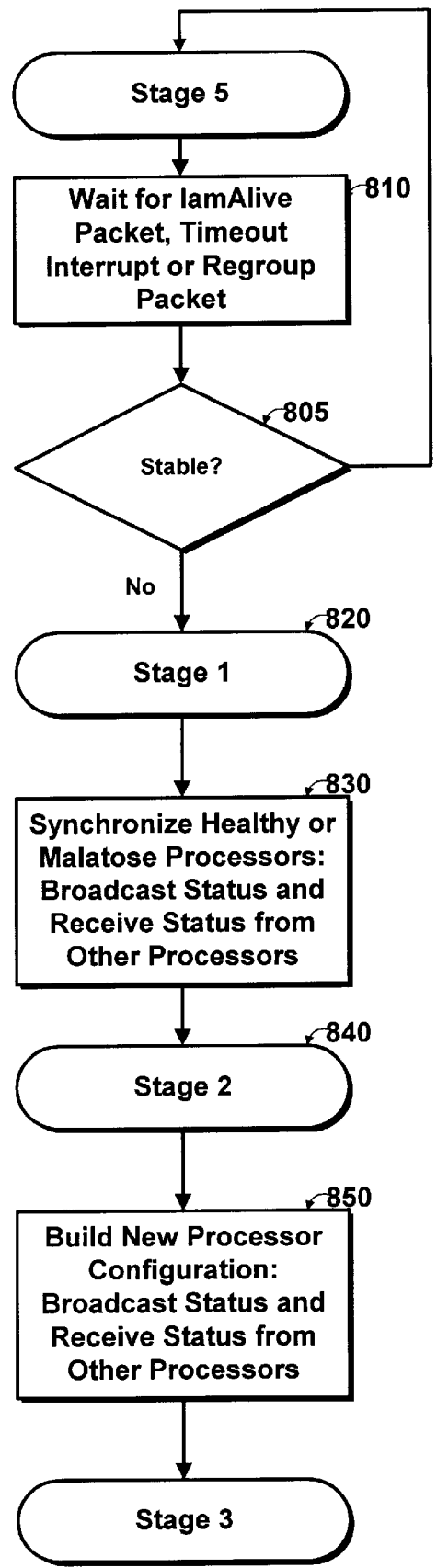
Figure 8B:
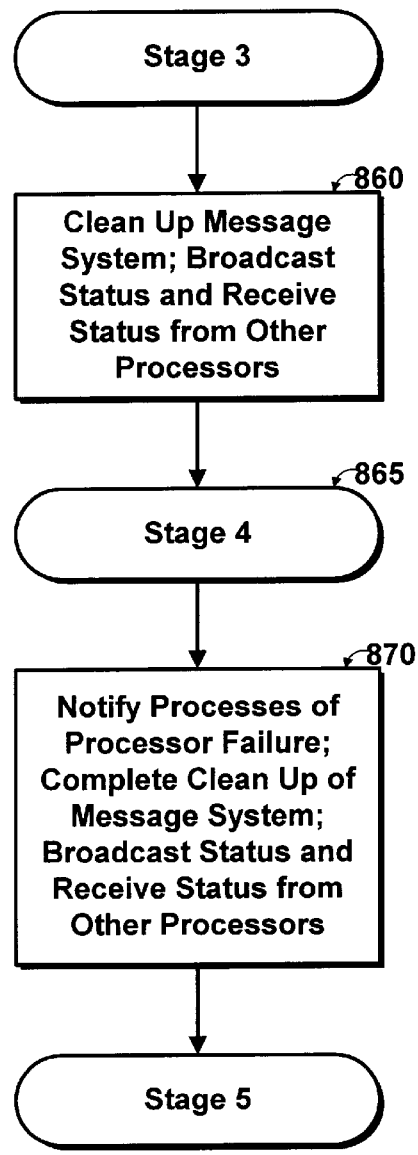
Figure 11:
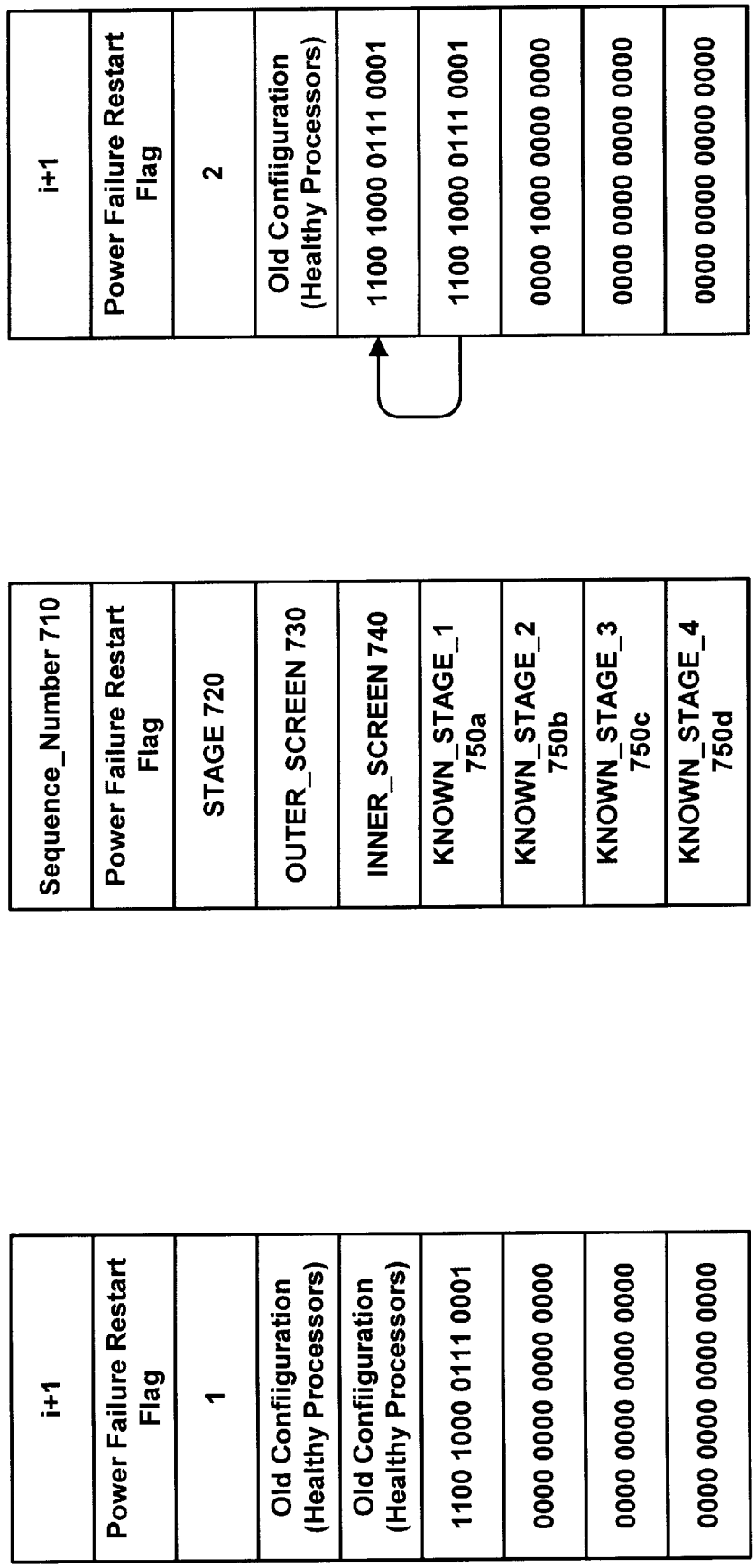
Figure 13:
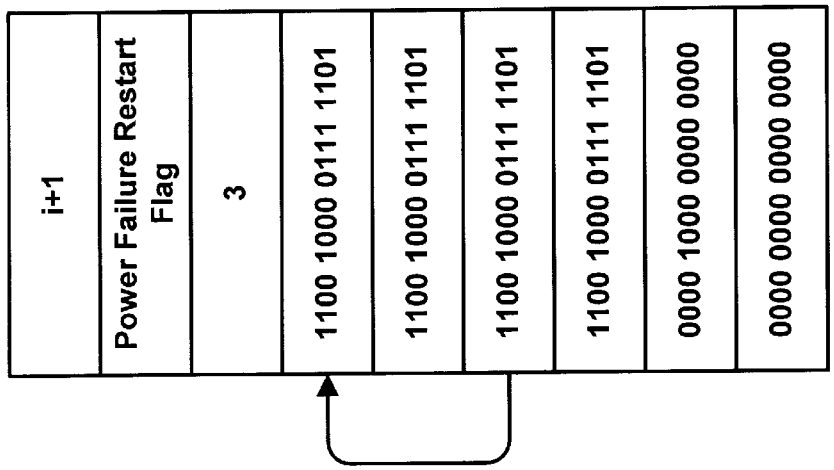
Figure 18A:
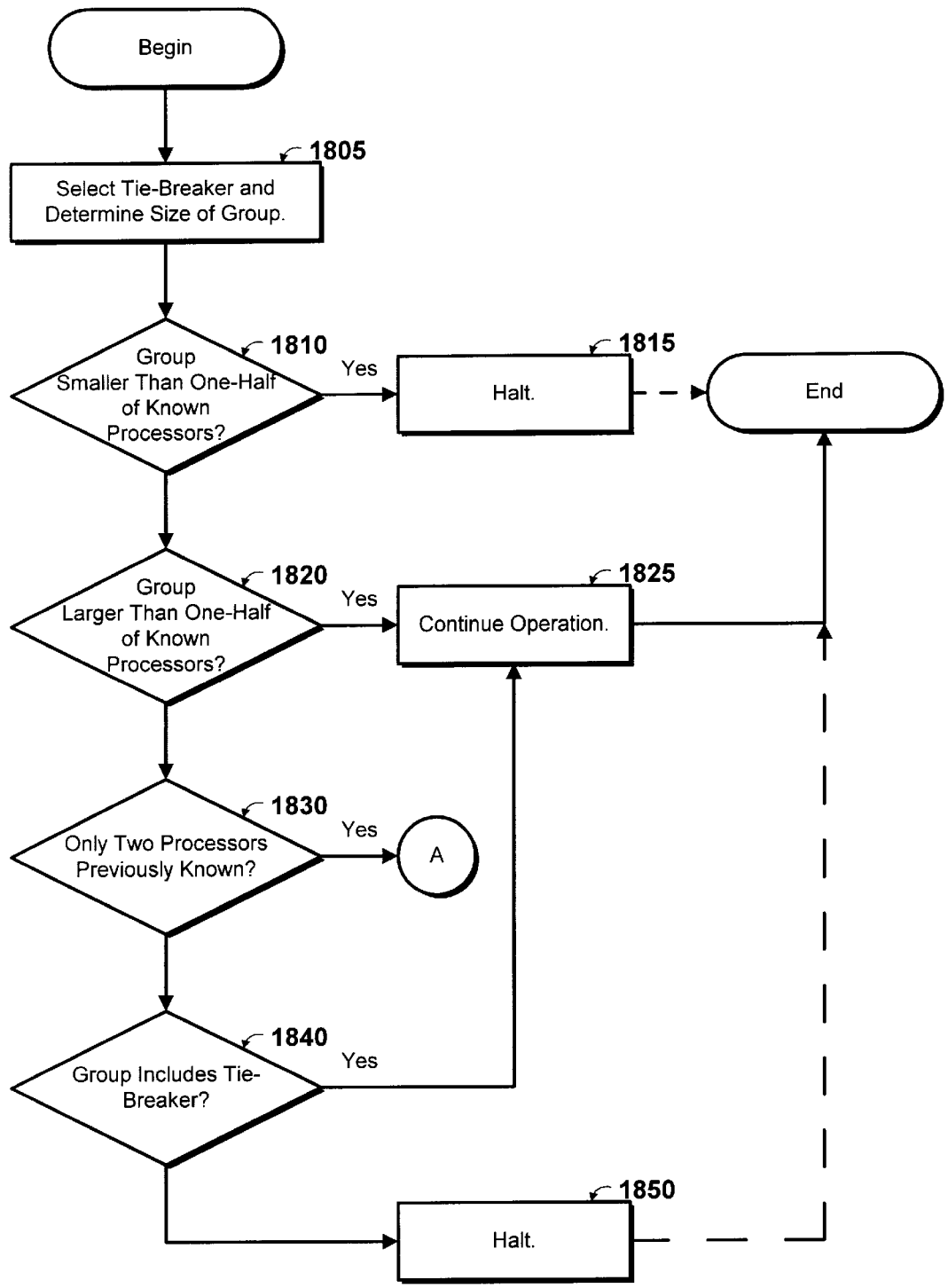
Figure 18B:
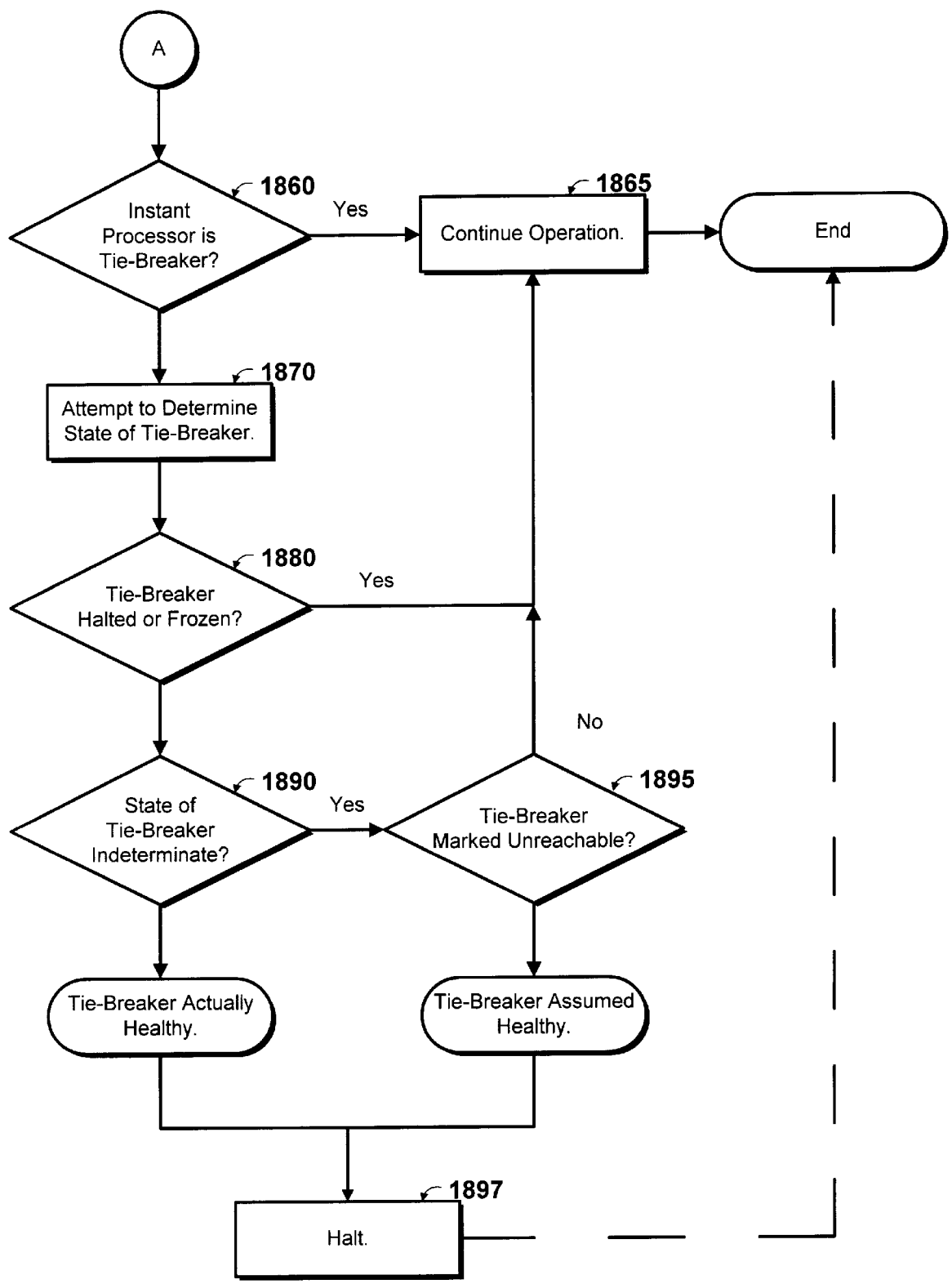

FIG. #_6 is a flow diagram that illustrates Stage I of a regroup operation according to the present invention;

FIG. #_7 is a regroup control template data structure;

FIGS. 8A and 8B are flow diagrams illustrating a portion of a regrouping incident;

FIG. #_9 summarizes the transition from stage 5 to stage 1 of a regroup incident;

FIG. #_10 summarizes the transition from the beginning of stage 1 to the end of stage 1;

FIG. #_11 summarizes the transition from the end of stage 1 to the beginning of stage 2;

FIG. #_12 summarizes the transition from the beginning of stage 2 to the end of stage 2;

FIG. #_13 summarizes the transition from the end of stage 2 to the beginning of stage 3;

FIG. #_14 summarizes the transition from the beginning of stage 3 to the end of stage 3;

FIG. #_15 shows the transition from the end of stage 3 to the beginning of stage 4;

FIG. #_16 summarizes the transition from the beginning of stage 4 to the end of stage 4;

FIG. #_17 summarizes the transition from the end of stage 4 to the beginning of stage 5, illustrating the old configuration for the next regrouping incident; and FIGS. 18A and 18B illustrate the split-brain avoidance methodology of the present invention.

DESCRIPTION OF THE PREFERRED EMBODIMENT

TABLE OF CONTENTS

Definitions
Overview
Data Structures
Protocols
   Tie-breaker processor Selection
   Regroup and Split-Brain Avoidance
      Stage I
      Stage II
   Regroup and Node Pruning
      Stage III
      Stage IV
      Stages V and VI
      Restarts
   Regroup and Detection of Timer Failures
Scenarios Revisited
What is claimed is
Definitions canonical matrix: a connectivity matrix C is in canonical form if and only if:

(1) if a processor i is dead, the row C(i,x) is FALSE, and the column C(x,i) is FALSE; and (2) if C(i,j) is FALSE, C(j,i) is FALSE. This ensures symmetric or bidirectional connectivity.

connected graph: a graph in which no processor is isolated from all other processors in the graph.

connectivity matrix: an NxN matrix C such that:

N is the number of processors;

each processor is uniquely numbered between 1 and N (or between 0 and N−1 if zero indexing is used);

C(i,i) is TRUE if processor i is healthy;

C(i,i) is FALSE if processor i is dead or non-existent;

C(i,j) is TRUE if processor i is connected to processor j and i≠j; and

C(i,j) is FALSE if processor i is not connected to processor j and i≠j.

disconnect: in a graph, the lack of an edge between two processors; a "missing" edge in a graph; a pair of processors between which there is no edge; a pair (i,j) such that C(i,j) is FALSE or C(j,i) is FALSE.

fully connected graph: a graph in which each processor has an edge with all other processors.

graph: a representation of the processors within a multi-processor system and of the communication links among those processors. The vertices of the graphs are the processors, and the edges are the communication links. The edges are bi-directional.

The terms "vertex" and "processor" are used interchangeably, as are the terms "communication link," "link" and "edge."

(Redundant links between a pair of processors are considered together as one link. In this embodiment, the communication network is ServerNet®, available from the assignee of the instant application, and the communication links are ServerNet® paths. A ServerNet® path is a sequence of ServerNet® links and routers.)

group: a proper subset of the processors in a multi-processor system. The subset of processors is interconnected communicatively. When a fully connected multi-processor system breaks into groups, the groups are disjoint and may not be fully interconnected.

maximal, fully connected subgraph: a fully connected subgraph that is not a proper subset of another fully connected subgraph of the same graph.

Overview

The multi-processor systems of the invention may be constructed, using the teachings of the U.S. Pat. No. 4,817,091, issued Mar. 28, 1989 (Attorney Docket No. 010577-49-3-1) and U.S. patent application Ser. No. 08/486,217, entitled "Fail-Fast, Fail-Functional, Fault-Tolerant Multi-processor System," filed Jun. 7, 1995, now U.S. Pat. No. 5,751,932, issued May 12, 1998, naming as inventors Robert W. Horst, et al., under an obligation of assignment to the assignee of this invention, with Attorney Docket No. 010577-028210/TA 214-1. Therefore, U.S. Pat. No. 4,817,091 and U.S. patent application Ser. No. 08/486,217 are incorporated herein by reference to the extent necessary.

FIG. #_1 is a simplified block diagram of a multi-processor system incorporating the present invention. The processors #_112 are interconnected by a network #_114 and connections #_116 that provide the processors #_112 with interprocessor communication via transceivers #_117. The network #_114 may be implemented by a standard communications interconnect such as an Ethernet LAN or by a bus system that interconnects processors #_112, in parallel, and is independent from any input/output (I/O) system that the processors may have, such as is taught by U.S. Pat. No. 4,817,091, mentioned above. Alternatively, the network #_114 could be implemented as part of a joint I/O system that provides the processors #_112 not only with access to various I/O units (e.g., printers, secondary storage, and the like—not shown) but also provides communication paths for interprocessor communication for the processors #_112. The network #_114 can also be any point-to-point network such as rings, fully-connected stars and trees.

Internal to or otherwise associated with each of the processors #_112 is a memory #_118 that is independent from the memory #_118 of the other processors #_112 and a time-of-day clock (not shown) independent of the time-of-day clocks of the other processors #_112. Also associated with each of the processors #_112 is a power supply #_120 that receives primary power (e.g., alternating current, not shown) to supply therefrom the necessary electrical power (e.g., direct current) for operation of the associated processor #_112.

In one embodiment, internal to or otherwise associated with each of the processors #_112 is a configuration option register #_119. The use of the configuration option register #_119 is taught in U.S. patent application Ser. No. 08/487, 941 entitled, "Method to Improve Tolerance of Non-Homogeneous Power Outages," naming as inventors Robert L. Jardine, Richard N. Collins and A. Richard Zacher, under an obligation of assignment to the assignee of the instant invention, with Attorney Docket No. 010577-033000/TA 272. U.S. patent application Ser. No. 08/487,941 is incorporated herein by reference.

The network #_114 forms the medium that allows the processors #_112 to send and receive messages to and from one another to communicate data, status, and other information therebetween. The medium is preferably a redundant network with at least two paths between every pair of processors.

FIG. No. _2 is a graph #_200 representing a five-processor multi-processor system #_200. The graph #_200 of FIG. No. _2 is fully connected. Each of the five processors 1–5 has a communications link with all of the other processors 1–5.

FIG. No. _3 is a graph #_300 representing a two-processor multi-processor system #_300. The system #_300 of FIG. No. _3 is also fully connected. The two processors 1, 2 are in communication with each other.

Now assume that faults occur that divide the system #_200 into the graph #_400 of FIG. #_4. In the graph #_400, the group of processors 1, 3, 4 and 5 is fully connected, and the group of processors 1, 2 and 5 is fully connected.

The processors of the graph #_400 all enter a regroup operation on the detection of the communication failures. According to the present invention, in order to avoid split-brain problems and to maintain a fully connected multiprocessor system, the processor 2 halts operations, while each of the processors 1, 3, 4 and 5 continues operations.

Similarly, where communications failures divide the system #_300 into the subgraphs of the processor 1 only and of the processor 2 only of the system #_500 of FIG. #_5, the processors perform a regroup operation. According to the present invention, in order to avoid split-brain problems and to maintain a fully connected multiprocessor system, the processor 2 halts, while the processor 1 continues operations.

Data Structures

Described below are the data structures and protocols used in a preferred embodiment to avoid split-brain, partial connection and timer-failure according to the invention.

Each processor #_112 in a multi-processor system incorporating the invention maintains a connectivity matrix C. The connectivity matrix is used to track the edges in the graph that survive communications failures. The connectivity matrix is also used to determine the maximal, fully connected subgraph to survive the communications failures and to determine whether each processor #_112 is to continue or halt its operations.

The size of the connectivity matrix C is NxN, where N is the number of processors #_112 in the multi-processor system. In one embodiment, each entry in the matrix is a bit, and each processor #_112 is uniquely numbered between 1 and N. An entry C(i,j) indicates the ability of processor i to receive a message from processor j. Herein, if the ability exists, the entry is set to one (or logical TRUE). If the ability does not exists, the entry is set to zero (or logical FALSE).

An entry C(i,i) is set to TRUE if the processor i is healthy. The entry C(i,i) is FALSE if the processor i is dead or non-existent. If a processor does not get Regroup messages from itself, it halts.

An entry C(i,j) is set to TRUE if the processor i is communicatively connected to the processor j (i≠j). The entry C(i,j) is set to FALSE if the processor i is not communicatively connected to processor j (i≠j).

Each processor #_112 also maintains a node pruning result variable. The pruning result variable is also a bit-structure, indicating which nodes of a multi-processor system survive the node pruning protocol described hereinbelow.

Another data structure is the IamAlive message. In one embodiment, an IamAlive message contains an identification of the broadcasting processor #_112, among other information. When successfully communicated, an IamAlive message indicates to the receiving processor #_112 the continued operation of the broadcasting processor #_112.

Still another data structure is the Regroup message. A Regroup message identifies the broadcasting processor #_112 and contains that processor's connectivity matrix. Thus, a Regroup message contains that processor's view of the system, including the identification of those processors #_112 it believes form the system. The Regroup message includes a pruning result variable and a cautious bit as well.

A multi-processor system according to one embodiment of the invention maintains a mask of unreachable processors. The mask is N-bit, where N is the number of processors #_112 in the multiprocessor system, each entry in the mask is a bit, and each processor #_112 is uniquely numbered between 1 and N. The maintenance and use of this mask is explained below.

Protocols

Tie-breaker processor Selection

One of the processors #_112 has a special role in the regroup process of the invention. This processor #_112 is designated the tie breaker. As described below, the split—brain avoidance process favors this processor #_112 in case of ties. Further, the node pruning process (described below) used to ensure full connectivity between all surviving processors is run on the tie-breaker processor #_112. This process also favors the tie breaker in case of large numbers of connectivity failures.

In one embodiment, the lowest numbered processor #_112 in a group is selected as the tie breaker. This simple selection process ensures that all processors #_112 in the group select the same tie breaker.

Regroup and Split-Brain Avoidance

Each of the processors #_112 of a multi-processor system according to the invention uses the network #_114 for broadcasting IamAlive messages at periodic intervals. In one embodiment, approximately every 1.2 seconds each of the processors #_112 broadcasts an IamAlive message to each of the other processors #_112 on each of the redundant paths to each other processor #_112. Approximately every 2.4 seconds each processor #_112 checks to see what IamAlive messages it has received from its companion processors #_112. When a processor #_112 fails to receive an IamAlive message from a processor (e.g., #_112b) that it knows to have been a part of the system at the last check, the checking processor #_112 initiates a regroup operation by broadcasting a Regroup message.

In effect, a regroup operation is a set of chances for the processor #_112b from which an IamAlive message was not received to convince the other processors #_112 that it is in fact healthy. Processor #_112b's failure to properly participate in the regroup operation results in the remaining processors #_112 ignoring any further message traffic from the processor #_112b, should it send any. The other processors #_112 ostracize the once-mute processor(s) #_112b from the system.

Stage I

Turning now to FIG. #_6, a flow diagram illustrates Stage I of the regroup operation, indicated generally with the reference numeral #_600. Each of the processors #_112 executes Stage I of the regroup operation. In fact, as the processors #_112 do not necessarily synchronize their operation, certain processors check for IamAlive messages earlier than others and enter the regroup operation before the others.

A processor #_112 may also enter Stage I of the regroup operation even though it has not detected an absence of any IamAlive messages if it first receives a Regroup message from a processor #_112 that has detected the absence of an IamAlive message.

Thus, Stage I begins (steps #_662a or #_662b) when a processor #_112 notes either that a companion processor has failed to transmit its periodic IamAlive message (step #_662a) or the processor #_112 receives a Regroup message from another of the processors #_112 (step #_662b). When a processor #_112 notes either of theses occurrences, it commences Stage I of the regroup operation.

Next, in addition to the actions of Stage I of the pre-existing regroup operation, the processors #_112 participating in the regroup operation each start an internal timer (not shown) that will determine the maximum time for Stage I operation, step #_664. Each processor #_112 also resets its memory-resident connectivity matrix C to all FALSE's (i.e., C(i,j) is zero for all i,j).

Also at step #_664, each processor #_112 suspends all I/O activity. (In one embodiment, a service routine holds all subsequent I/O requests in request queues rather than sending them out on the network #_114.) Only Regroup messages may flow through the network #_114 during this period. The processors #_112 resume I/O activity only after the regroup operation finalizes the set of surviving processors (i.e., after Stage III).

At step #_666 each of the processors #_112 sends per-processor, per-redundant-path Regroup messages, containing the processor's view of the system, including its own identity, a connectivity matrix C, and the optional cautious bit. (The processors #_112 set and use the cautious bit according to the teachings of U.S. patent application Ser. No. 08/265,585 entitled, "Method and Apparatus for Fault-Tolerant Multi-processing System Recovery from Power Failure or Drop-Outs," filed Jun. 23, 1994, naming as inventors Robert L. Jardine, Richard M. Collins and Larry D. Reeves, under an obligation of assignment to the assignee of this invention, with Attorney Docket No. 010577-031900/ TA 271. U.S. patent application Ser. No. 08/265,585 is incorporated herein by reference.) This Regroup message prompts all other processors #_112—if they have not already done so on noting the failure of a processor #_112 to send an IamAlive message—to also enter the regroup operation.

At step #_668, a processor #_112 examines the Regroup message(s) it has received and compares the connectivity matrix C contained in the message(s) with that the processor #_112 maintains in its memory #_118. If there are differences, the system view maintained in the memory 18 is updated accordingly.

In one embodiment, the connectivity matrix in a Regroup message is an N×N bit matrix. This bit matrix is OR-ed with an N×N bit matrix that a processor #_112 receiving the Regroup message maintains in its memory #_118. Thus, for any processor i marked in any Regroup message as present, i.e., C(i,i) is set to TRUE in the Regroup message connectivity matrix, the processor #_112 marks that processor i as present in the memory-resident matrix, i.e., C(i,i) is set to TRUE in the memory-resident connectivity matrix.

Thus, the connectivity matrix can include the KNOWN_STAGE_n variables #_750 described above.

In addition, when a processor i receives a Regroup message from a processor j (on any path), the processor i sets the C(i,j) entry of its memory-resident connectivity matrix to TRUE, indicating that processor i can receive messages from processor j.

As indicated above, two entries exist for the pair of processors i and j: C(i,j) and C(j,i). The processor i sets the entry C(i,j) to TRUE when it receives a Regroup message from processor j, while the processor j sets the entry C(j,i) to TRUE when it receives a Regroup message from processor i. This dual-entry system allows the multi-processor system to detect failures that break symmetry, i.e., processor i can receive from processor j but processor j cannot receive from processor i.

Stage I completes when all known processors #_112 are accounted as healthy, or some predetermined amount of time has passed.

Stage II

The connectivity matrix is used to track the processors known in Stage I and to determine when the processors known in Stage II are the same as those from Stage I. In the previously existing regroup operation, the processors exited Stage II when the processors #_112 participating in Stage II agree as to the view of the system #_100. In the regroup operation of the invention, Stage II continues after the processors agree as to the view of the system.

The connectivity matrix is also used to detect the lack of full connectivity in the group of processors that survive the initial stages of the regroup operation. After Stage I and (the beginning of) Stage II of the regroup operation have determined the set of present processors in a connected subgraph, each processor applies the split-brain avoidance methodology described below and illustrated in FIGS. #_18A and #_18B to ensure that only one subgraph of processors survives. The methodology involves selecting a tie-breaker processor, step #_1805. A node-pruning protocol may subsequently be run to select a fully connected subgraph.

In one embodiment, each processor #_112 selects as the tie-breaker processor the processor #_112 that (1) was a part of the system at the end of the last regroup operation to complete (or at system startup, if no regroup operation has completed) and (2) had the lowest unique identifying number. All processors #_112 will pick the same tie-breaker processor #_112.

More loosely, the processors #_112 select as the tie-breaker the processor #_112 that had the lowest unique identifying number just before the current regroup operation began. This definition is more loose in that, as related above, the current regroup operation may have begun in the middle of an ongoing regroup operation. Thus, all of the processors #_112 may not agree as to all of the processors #_112 known just before the current regroup operation began.

In applying the split-brain avoidance methodology of the invention, each processor #_112 makes the following decisions:

1. If its group has more than one-half of the processors that were present before this regroup operation started, as given by the OUTER_SCREEN variable #_740 described above, then the processor continues operations, steps #_1820 and #_1825.

2. If its group has less than one-half of the processors that were present before this regroup operation began, then it halts itself immediately, steps #_1810 and #_1815.

3. If its group has exactly one-half of the processors that were present before this regroup, and its group has at least two processors, steps #_1830, then the tie-breaker processor is used to break the tie as follows.

3.1: If its group includes the tie-breaker processor, then the processor continues operations, steps #_1840 and #_1825.

3.2: If its group does not have the tie-breaker processor, then the processor halts itself immediately, step #_1850.

4. If its group has exactly one processor and exactly two processors existed before this regroup operation began, then 4.1: If the processor is the tie-breaker processor, then the processor continues operations, steps #_1860 and #_1865.

4.2: If the processor is not the tie-breaker processor, then the processor attempts to survive: The processor first checks the state of the tie-breaker processor, step #_1870. (In one embodiment, the processor requests a service processor (SP) to get the status of the tie breaker. The SP may have independent knowledge about the status of the tie breaker and may be able to return that status. The status returned is one of the following five values: The processor is halted (or running non-operational code); the processor is in a hardware-error (self-check) freeze state; the processor is running the NONSTOP KERNEL® operating; the SP is communicating with the processor but for some reason cannot get the processor's status; and the communication of the status request failed for some reason.) If the tie breaker has halted or is in a hardware-error freeze state, then the processor survives, steps #_1880 and #_1865. If the state of the successfully communicating tie breaker cannot be determined (e.g., the SP request failing due to an SP connection failure, the SP replying that it cannot determine the condition of the tie breaker, or the multi-processor system not including the equivalent of service processors), step #_1890, then the processor checks the mask of unreachable processors. If the tie breaker is not marked unreachable, the processor assumes the tie breaker is malatose and survives, steps #_1895 and #_1865. If, however, the tie breaker is marked unreachable, the processor assumes that the tie breaker is healthy and applying this methodology. It halts operations, steps #_1895 and #_1897.

This split-brain avoidance methodology could lead a processor #_112 to halt itself. Indeed, even the tie-breaker processor #_112 may halt itself. Therefore, if the processor #_112 survives the application of the split-brain avoidance methodology, it again selects a tie-breaker processor #_112. In a preferred embodiment, each processor #_112 selects the lowest-numbered surviving processor as a tie breaker for the remainder of Stage II, the subsequent stages of the regroup operation and in post-regroup operation, until another tie breaker is selected as herein described. All processors #_112 that survive the application of the split-brain avoidance methodology pick the same tie-breaker processor #_112.

If the processor is not the tie breaker, then it stays in Stage II until it gets a message from the tie-breaker processor #_112 (or regroup restarts after a stall-detection time-out).

This completes the split-brain avoidance protocol. For a multi-processor system implementing the split-brain avoidance protocol without the node pruning protocol, Stages III through V complete as described above. However, a system seeking to make itself or maintain itself as a maximally, fully connected multi-processor completes Stage II and continues, as described below. (of course, a multi-processor system can apply the node pruning methodology independently of the split-brain avoidance methodology.)

Regroup and Node Pruning

If the processor is not the tie breaker, then it stays in Stage II until it gets a message from the tie-breaker processor #_112 or another processor #_112 in Stage III with its pruning result variable set (or regroup restarts after a stall-detection time-out). As soon as a processor #_112 gets such a Stage III packet, it enters Stage III and sets its local pruning result variable to the value found in the Stage III packet it received.

The tie breaker has additional Stage II responsibilities of collecting connectivity information, deciding when to stop collecting the information and pruning the connectivity graph to determine the final group of processors #_112 that survive the regroup operation.

In stages I and II, the connectivity information builds up on all processors #_112 in their respective memory-resident connectivity matrices C as the processors #_112 exchange Regroup messages containing copies of the memory-resident matrices C. The tie breaker collects connectivity information along with all the other processors #_112.

The tie breaker decides when to stop collecting the connectivity information. It gives all processors #_112 a reasonable amount of time to send Regroup messages and thereby establish connectivity. If the tie breaker were to stop collecting information too soon, the connectivity graph built might be incomplete, resulting in available processors #_112 being declared down and pruned out in order to satisfy the full connectivity requirement. Incomplete connectivity information does not violate the requirements that the final surviving group be consistent on all processors #_112 and fully connected, but it can take out processors #_112 that could have been saved.

In one embodiment, the tie breaker waits 3 regroup ticks (spaced 300 milliseconds apart) after completing the split-brain methodology (and selecting itself as the tie breaker) before proceeding to apply the node-pruning methodology. Since each processor #_112 transmits Regroup messages to all processors #_112 at each Regroup tick and whenever its regroup stage changes, this three-tick delay allows each processor #_112 at least four chances to send messages containing connectivity information: once when Stage I is entered, once when Stage II is entered, and twice more while the tie breaker waits. In addition, messages are sent on all redundant paths.

Thus, the tie breaker stops collecting connectivity information when the first of the following two events occurs: (1) its memory-resident connectivity matrix C indicates that all paths are up (i.e., there is full connectivity) or (2a) a predetermined number of regroup ticks have elapsed since the completion of the application of the split-brain avoidance methodology or (2b) for multi-processors systems not implementing the split-brain avoidance protocol, a predetermined number of regroup ticks have elapsed since the determination that all Stage I processors have entered Stage II.

After the tie-breaker processor #_112 stops collecting connectivity information, the tie breaker applies the pruning process and comes up with the final group of surviving processors #_112. Note that the tie breaker can prune itself out without affecting the efficacy of the pruning methodology. The tie breaker always has the responsibility of informing the other processors #_112 of its decision. The pruned processors #_112 (including the tie breaker) do not halt until they enter Stage IV.

To get a fully connected graph from the potentially partially connected graph of surviving processors, the tie-breaker processor #_112 first runs a process that lists all the maximal, fully connected subgraphs. It then uses a selection process to pick one from the set of alternatives.

In one embodiment, these processes run in interrupt context on the tie-breaker processor #_112 and have low upper bounds for execution time and memory requirements. The process that lists all the candidate subgraphs requires a large amount of memory and execution cycles if the number of disconnects is large. Therefore, if the number of disconnects is larger than a fixed number (8 in one embodiment), then a simpler scheme that picks a fully connected graph that is not necessarily optimal is preferred.

The method for generating the complete list of maximal, fully connected subgraphs in a graph represented by a connectivity matrix is described below.

The input is the N×N connectivity matrix C described above. The output is an array of sets of processors that form maximal, fully connected subgraphs.

The methodology uses the following property: When the edge (i,j) is removed (forming the disconnect (i,j)) from a fully connected graph that includes vertices i and j, two maximal, fully connected subgraphs are formed. One subgraph is the original graph with vertex i (and the edges connected to it) removed and the other subgraph is the original graph with vertex j (and its edges) removed.

A partially connected graph can be viewed as a fully connected graph to which a set of disconnects has been applied. To compute the set of all maximal, fully connected subgraphs, a processor #_112 first makes a list of the disconnects in the connectivity matrix C. Next, the processor #_112 makes an initial solution set that has one member—a fully connected graph with all the vertices in the original graph. The processor #_112 then successively improves the solution set by applying the disconnects one by one.

The method has the following steps:

1. Compute the set of all dead processors, that is, the set of all processors i such that C(i,i) is FALSE.
2. Convert the connectivity matrix into canonical form: Remove rows and columns corresponding to dead processors, and make the matrix symmetric.
3. Compute the set of all disconnects, the set of pairs (i,j) such that C(i,i) is TRUE, C(j,j) is TRUE (that is, processors i and j are alive) and C(i,j) is FALSE. Let D be the size of the set of disconnects.
4. The variable groups is the solution array and the variable numgroups is the number of entries in the solution array. Start with an initial solution that contains one group that is equal to the set of live processors.

```
groups := live_processors;      /* groups is an array
                                   of SET's*/
numgroups := 1;                 /* number of elements in the
                                   array*/
```

All live processors #_112 are initially assumed to be fully connected. Each disconnect is applied in turn, breaking the groups in the array into fully connected subgroups.

5. Process each disconnect by applying it to the current elements in groups.

Applying a disconnect (i,j) to a group of processors #_112 that does not contain processor i or j has no effect. Applying the disconnect (i,j) to a group that contains both processors i and j splits the group into two fully connected subgroups, one the same as the original with processor i removed and the other the same as the original with processor j removed.

When a group thus splits into two subgroups, the processor #_112 examines each of the new subgroups to see whether it already exists or is a subset of an already existing group only new and maximal subgroups are added to the array of groups.

Following is sample C code to perform this methodology. The sample code assumes a function group_exists_or_is_subset() to check if a given group is a member of the current set of groups or is a subset of an existing group. It also assumes a function library that implements the set type (a type SET and functions SetMember( ), SetCopy( ), SetDelete( ) and SetSwap( ).

```
for (i=0; i<D; i++) /* go through the disconnects*/
{
    for (j=0; j < numgroups; j++)   /* go through the groups
                                       generated so far */
    {
        /* Split group j if it has both vertices of
        disconnect i.*/
        if (SetMember(groups[j],disconnects[i][0]) &&
        SetMember(groups[j],disconnects[i][1]))
        {
            /* We need to remove group j and replace it
            with two new groups. This is done by modifying
            group j in place and adding a new group at the
            end of the array.*/
            numgroups ++;
            /* copy group j to the end of the array*/
            SetCopy(groups[j],groups[numgroups-1]);
            /* remove the first vertex from group j */
            SetDelete(groups[j], disconnects[i][0]);
            /* remove the second vertex from group added at
            the end of the array*/
            SetDelete(groups [numgroups-1], disconnects
            [i][1]);
            /* Check if the new groups already exist or are
            subgroups of existing groups.*/
            /* First check the group added at the end.*/
            if (group_exists_or_is_subset(groups,
                    numgroups-1, groups[numgroups-1]))
                numgroups--;
            /* Now check the updated group j. First,
            switch it with the last element of the array.
            To remove it, simply decrement the array
            count.*/
            /* The j-th entry has been switched; it has to
            be examined again */
            SetSwap(groups[j], groups[numgroups-1]);
            j--;
            if (group_exists_or_is_subset(groups,
                    numgroups-1, groups[numgroups-1]))
                numgroups--;
        }
    }
}
```

Now, numgroups is the number of maximal, fully connected subgraphs, and groups contains these subgraphs.

From the set of subgroups thus found, one group survives. If one treats all processors the same, the best candidate for survival can be defined as the one with the greatest number of members. In case of a tie, an arbitrary one can be picked.

In one embodiment, processors have different survival priorities based he kinds of services each provides. For instance, in the NONSTOP KERNEL® and NONSTOP CLUSTERS ("NSC") (NONSTOP CLUSTERS is a trademark of the Assignee of the invention described and claimed herein.) COUPLED UNIX (UNIX is a registered trademark of AT&T Bell Laboratories operating system software available from the assignee of the instant invention, processors that have a primary or backup $SYSTEM process (a process providing a system-wide service) have a higher survival priority.

As another example, the lowest-numbered processor can have the highest survival priority, as explained above.

The execution speed of this node-pruning process depends on the number of disconnects D and the number of fully connected groups G. For a given D, the order approximates $D*2^D$. Clearly, the worst case order is too large to attempt for the example sixteen-processor system, but this is small for very small values of D. In real life, very few disconnects, if any, are expected.

In a preferred embodiment, when either N (number of live nodes) or D (number of disconnects between live nodes) is less than, e.g., 8, the above process for listing groups is used. This limits the number of groups generated and examined to 256.

However, when the number of disconnects and maximal fully connected subgraphs is large (e.g., greater than 8), processes listing all groups become too time consuming to execute in an interrupt context. Since disconnects result from rare, multiple failures, picking a sub-optimal group as the surviving group in the face of a large number of disconnects is acceptable.

Therefore, when both N and D are greater than, e.g., 8, the tie breaker will pick one fully connected subgraph randomly or by other simple means.

In the NONSTOP KERNEL® operating system and NSC preferred embodiments mentioned above, a $SYSTEM processor is considered a critical resource, and the tie breaker attempts to select a group that includes one of the $SYSTEM processors. If the processor running the primary $SYSTEM process is healthy, the tie breaker picks a group that includes that processor. If, however, the processor running the primary $SYSTEM process has died, but the processor running the backup $SYSTEM process is alive, then a group that includes the latter processor is selected.

If both $SYSTEM processors are dead, then the tie breaker selects a group that includes itself.

The selection described above proceeds as follows:

1. Start with a group that contains a selected processor. Select the primary $SYSTEM processor if it is healthy. If the primary $SYSTEM processor is dead, but the backup $SYSTEM processor is healthy, select the backup $SYSTEM processor. Otherwise, select the tie breaker.

2. Examine each live processor. If it is connected to all members of the current group, add the processor to the group. (This process gives higher priority to the processors examined earlier since they need to have connectivity to fewer processors to be added to the group.)

3. When all processors have been examined, the group is complete. This group survives this regroup incident. The tie breaker then enters the next stage (Stage III) of the regroup operation.

Stage III

When the tie breaker enters Stage III, according to the node pruning protocol, it additionally sets the Regroup message pruning result variable to the group selected to survive. The tie breaker then informs all other processors #_112 that it has entered Stage III by sending them the value of its pruning result variable.

In Stage III, each processor #_112 informs all processors (including the pruned out ones) that it is in Stage III and relays the tie breaker's pruning decision. If a processor #_112 finds itself pruned out, it does not halt until it enters Stage IV. To guarantee that all processors #_112 get to know the tie breaker's pruning decision, the pruned out processors #_112 participate in relaying the pruning decision.

Stage IV

A processor #_112 in Stage III enters Stage IV when it determines that all of the processors #_112 known to be available in Stage II have entered Stage III. This means that all processors #_112 in the connected group have been informed of the pruning decision. The processor #_112 can now commit to the new surviving group. A processor #_112 that finds itself pruned out stays in Stage III until it hears that a processor #_112 that was not pruned out has entered Stage IV. The pruned out processor #_112 then halts, since that survivor processor #_112 in Stage IV can ensure that all other survivors will enter Stage IV. (The tie-breaker processor #_112 that executed the node pruning can now halt if it was not among the survivors. The tie breaker's role in the current regroup operation is complete.)

As a surviving processor enters Stage IV, it sets its OUTER_SCREEN and INNER_SCREEN #_730 and #_740 to reflect the pruning result, selects the lowest-numbered surviving processor #_112 as indicated by the pruning result variable as the tie breaker for use in the next regroup operation, and cleans up any messages from and to the processors #_112 that did not survive.

If a regroup operation restarts at Stage III, a processor #_112 checks the pruning result variable. If the processor #_112 finds itself pruned out, it halts. This guarantees that if any processor #_112 has committed to the new surviving group and entered Stage IV, the pruned out processors #_112 do not survive the restart of the regroup operation.

If connectivity is very poor, a pruned out processor (say, processor #_112b) can stall in Stage III. This can happen, for instance, if all processors #_112 with which processor #_112b can communicate have also been pruned out and halt before processor #_112b can enter Stage IV. When the processor #_112b detects that it is not making progress in Stage III (after some number of clock ticks have passed), the regroup operation restarts. As described above, this restart will cause the processor #_112b to quickly kill itself.

A system with pruned out processors #_112 that have been isolated could briefly experience a split-brain situation as the surviving processors #_112 quickly complete regroup and declare the pruned out processors #_112 dead while the pruned out processors #_112 are stalling in Stage III. This, however, does not cause data corruption since these processors #_112 suspend all I/O traffic while in stages I through III of a regroup operation.

The pre-existing Stage III as described above constitutes the remainder of this Stage IV of the regroup operation of the invention.

Stages V and VI

The pre-existing stages IV and V are renumbered V and VI for the regroup operation of the invention.

Maintenance of Mask of Unreachable Processors

If a processor #_112 detects that no packets are getting through on any of the redundant paths to another processor #_112, it sets to logical TRUE the bit in the mask of unreachable processors corresponding to that other processor #_112. A new regroup incident, however, does not start. Because regroup incidents suspend general I/O, a multiprocessor system should spend minimal time doing such reconfiguring. A regroup incident will start soon enough on the detection of missing IamAlives due to the link failure.

The mask of unreachable processors is used in Stage II as described above. The mask is maintained until Stage III.

When regroup is in Stage III, any node pruning has already happened and the new group has self-pruned accordingly. The mask is examined. If the new group contains both the local processor #_112 and the unreachable processor #_112, then the regroup operation restarts.

This seemingly complicated scheme is preferable to restarting regroup each time a link failure is detected as the former prevents a regroup operation from restarting many times due to multiple link failures that are detected due to the sending of regroup packets but which actually occurred before the regroup incident started. In a preferred embodiment, in order to detect regroup software bugs as well as severe connectivity problems that get worse as regroup proceeds, the processor #_112 halts if the regroup operation restarts more than 3 times without completing once.

If a link comes up after a regroup operation has started, its effect on the procedure depends on how far the procedure has progressed. If the link comes up in time to make the tie breaker consider the link operational, the link "survives" (that is, one of the processors #_112 connected by the link escapes certain death). Regroup packets have to go in both directions, and this fact has to be conveyed to the tie breaker before the tie breaker considers the link good. If the link status change happens too late in the regroup incident for the tie breaker to detect it, the link is considered down and at least one of the processors #_112 connected by the link is killed. This exclusion is acceptable. Therefore, a link coming up event is not reported to regroup, unlike a link failure event.

Restarts

To make progress through the stages of a regroup operation, a processor #_112 needs to hear from the processors #_112 from which it has previously heard. If a processor #_112 or communication link fails after a regroup operation starts, the processor #_112 can stall in any of the stages after Stage I. Therefore, a timer (not shown) detects the lack of progress. The processor #_112 starts the timer when it enters Stage II of the regroup operation and clears the timer on entering Stage VI when the regroup operation stabilizes. If the timer expires before the algorithm ends, the processor #_112 restarts the regroup operation (i.e., re-enters Stage I).

After a processor #_112 commits to a new group and declares another processor #_112 dead, the banished processor #_112 is not allowed to come back in when the regroup operation restarts. A processor #_112 commits to a new group when it enters Stage IV. It does so only after all processors #_112 in the connected graph of processors known at Stage II have entered Stage III and have set the pruning result variable to the commit group. If the regroup operation restarts now, all pruned out processors #_112 kill themselves since the pruning result variable indicates that they have been excluded. Processors #_112 that were not in the connected graph (at Stage II) cannot join the group since they are not among the processors #_112 known at Stage II.

Message clean up actions must be completed correctly, regardless of how many times the algorithm goes through restarts.

Regroup and Detection of Timer Failures

Independently of or in conjunction with the split-brain avoidance and/or the node-pruning protocols, a multiprocessor system can detect the loss of timer expirations as follows: A processor #_112 running the regroup algorithm does not advance through Stage I until the processor #_112 receives a timer tick. If a processor has corrupted operating system data structures (e.g., a time list), the regroup engine will not receive its periodic ticks and will not advance further than Stage I. Since the malatose processor #_112 does not indicate that it has entered Stage I, the other processors will declare it down. The faulty processor halts on receipt of a Stage II Regroup message or a poison packet indicating that it has been eliminated.

In the split-brain avoidance and node-pruning scenarios, the connectivity matrix preferably subsumes the KNOWN_STAGE_n variables #_750. In these embodiments, a processor #_112 does not update its connectivity matrix C until it receives a timer tick.

Scenarios Revisited

The application of the invention to the above five-processor and two-processor scenarios is described below.

FIG. #_2 is a graph #_200 logically representing a five-processor multi-processor system #_200. The graph #_200 of FIG. #_2 is fully connected. When communication faults occur dividing the system #_200 into the graph #_400 of FIG. #_4, each processor #_112 applies the split-brain avoidance methodology described above. The processor 2, for example, may notice its failure to receive an IamAlive message from processor 3, for example. The processor 2 accordingly initiates a regroup operation. In Stage I of that Regroup operation, the processor 2 starts its internal timer, resets its connectivity matrix C and suspends I/O activity. The processor 2 then sends a Regroup message and receives and compares Regroup messages, updating its connectivity matrix C accordingly. The processor 2 receives Regroup messages from processors 1 and 5, and these Regroup messages indicate the existence of processors 3 and 4. When the appropriate time limit has been reached, the processor 2 proceeds to Stage II.

In Stage II, the processor 2 selects the processor 1 as the tie-breaker processor #_112 since the processor 1 was the lowest numbered processor #_112 at the end of the last regroup operation to complete.

The processor 2 then applies the split-brain avoidance methodology: The processor 2 recognizes that the group of processors #_112 of which it is a part has more than one-half of the processors that were present before this regroup operation started. Accordingly, the processor 2 continues operations.

Indeed, the group has all five of the processors 1–5 in the system #_400, and all five of the processors 1–5 will continue operations at this point. All five of the processors 1–5 select processor 1 as the tie breaker.

The tie-breaker processor 1 waits in Stage II until either a reasonable amount of time to send Regroup messages has passed or until its connectivity matrix C indicates that all paths are up. Here, by assumption, all paths are not up, and the tie-breaker processor 1 waits in Stage II the reasonable amount of time. It then applies the node-pruning methodology to determine the final group of processors #_112 to survive the regroup operation. It then distributes this decision in a Stage III Regroup message with the node-pruning result variable set to reflect the decision. The processors 2–5 wait in Stage II until they receive this Regroup message with its pruning result variable set.

Using its memory-resident connectivity matrix C as input, the tie breaker computes the set of all dead processors. This set is the null set, and a conversion of the matrix C to canonical form leaves this matrix C unchanged. The tie breaker computes the set of disconnects as $\{(2, 3), (2, 4), (3, 2), (4, 2)\}$, with D=4, and applies these disconnects to the set of live processors $\{1, 2, 3, 4, 5\}$. The resulting groups of processors #_112 are $\{1, 3, 4, 5\}$ and $\{1, 2, 5\}$. Thus, the number of maximal, fully connected subgraphs is two.

Depending on the criteria for survival, either of the two groups may survive. If the criterion is the largest group, then the tie breaker selects the group $\{1, 3, 4, 5\}$ for survival. If the criterion is the group with the lowest-numbered processor, then either group can survive (with the former criteria used as a tie breaker or with one group chosen randomly, for example). If the processor 2 is running a high-priority process, the tie breaker may chose the group {1, 2, 5} for survival. These are merely a few examples of the criteria disclosed in the related patent applications enumerated above or well-known within the art. Assume that the group {1, 3, 4, 5} survives.

The tie-breaker processor communicates this decision by setting the node-pruning variable in the next Regroup message that it sends out. The sending of the message indicates that the tie breaker is in Stage III, and the receipt of that message (directly or indirectly) causes the other processors 2–5 to enter into Stage III also. The pruning result variable of all processors 2–5 in Stage III hold the same value indicating that the processors 1, 3, 4 and 5 are to continue operations and that the processor 2 is to halt operations. Each of the processors 1–5 relays this pruning result in the Regroup messages that it respectively originates.

When each of the processors 1–5 gathers Regroup messages indicating that all of the processors #_112 known to it in Stage II have entered Stage III, then the processor enters Stage IV and commits to the pruning result. At this stage, processor 2 halts operations. The regroup operations continues to completion. The maximal, fully connected group of processors 1, 3, 4 and 5 continues operation as the newly reconfigured system.

Likewise, FIG. #_3 is a graph #_300 logically representing a two-processor multi-processor system #_300. The graph #_300 of FIG. #_3 is fully connected. When communication faults occur dividing the system #_300 into the graph #_500 of FIG. #_5, each processor #_112 marks the other as unreachable in the mask of reachable processors and applies the split-brain avoidance methodology described above. The processor 1, for example, may notice its failure to receive an IamAlive message from processor 2. The processor 1 accordingly initiates a regroup operation. In Stage I of that Regroup operation, the processor 1 starts its internal timer, resets its connectivity matrix C and suspends I/O activity. The processor 1 then sends a Regroup message and prepares to receive and compare Regroup messages in order to update its connectivity matrix C. In this scenario, however, the processor 1 receives no such Regroup messages. When the appropriate time limit has been reached (and if the processor 1 of itself constitutes enough resources to continue operations, if appropriate), the processor 1 proceeds to Stage II.

In Stage II, the processor 1 selects itself as the tie-breaker processor #_112 since it was the lowest numbered processor #_112 at the end of the last regroup operation to complete.

The processor 1 then applies the split-brain avoidance methodology: The processor 1 recognizes that the group of processors #_112 of which it is a part has neither more nor less than one-half of the processors #_112 that were present before the regroup operation began. Its group has exactly one-half of the pre-existing processors #_112, and the processor 1 uses the fact that it is itself the tie-breaker processor #_112 as the decision point to continue operations.

Not being the tie breaker, the processor 2 attempts to check the state of the tie-breaker processor 1 (in one embodiment, using the service processors). If the state of the tie breaker can be determined, the processor 2 realizes that the tie breaker is healthy. The processor 2 halts.

Where the state of the tie-breaker processor 1 cannot be determined, the processor 2 checks the mask of unreachable processors. Noting that the tie breaker is marked unreachable, the processor 2 assumes that the tie breaker is healthy and halts.

Thus, the tie-breaker processor 1 continues operation while the processor 2 halts.

The processor 1 selects itself as the tie-breaker processor #_112 and remains in Stage II until a reasonable amount of time passes. (The processor 2 cannot and indeed does not send Regroup messages as the communication fault has occurred and the processor has halted.)

The processor 1 applies the pruning process and determines the group of processors #_112 that are to survive the regroup operation. Using its memory-resident connectivity matrix C as input, the tie breaker computes the set of all dead processors, {2}, and converts its matrix C into canonical form. This conversion leaves a 1×1 matrix C including only the processor 1. The tie breaker computes the set of disconnects as the set {(1, 2), (2, 1)}, with D=2. However, as the set of live processors {1} does not include the processor 2, applying these disconnects to that set has no effect. The number of maximal, fully connected graphs is one, and the tie breaker sets its pruning result variable to indicate that only it will survive. The tie breaker communicates this result in its subsequent Regroup messages and thus passes through Stages III and IV. The system #_500 completes the regroup operation and continues operations with only the processor 1 running.

Finally, consider again the logical multi-processor systems #_200. Now, the processor 2 experiences a corruption of its time list, fails to receive timer expiration interrupts and loses its ability to send the requisite IamAlive messages. The detection of the missing IamAlive messages by any of the other processors 1 or 3–5 causes a regroup operation to begin.

In Stage I of the regroup operation as related above, the processors 1–5, operating according to one embodiment of the invention, each refrain from sending respective Stage I Regroup messages until each receives a timer expiration interrupt. Thus, the processors 1 and 3–5 readily proceed to send Stage I Regroup messages.

By hypothesis, the processor 2 does not receive timer interrupts and thus never sends a Stage I Regroup message. The other processors 1 and 3–5 update their respective KNOWN_STAGE_1 variables #_750*a* (and/or their respective connectivity matrices C) to reflect the healthiness of the processors 1 and 3–5 and the apparent death of the processor 2. After some predetermined amount of time has passed waiting for the processor 2, the processors 1 and 3–5 proceed to Stage II.

In Stage II, the processors 1 and 3–5 now broadcast Stage II Regroup messages. The processors 1 and 3–5 are healthy and the processor 2 is still malatose, and the Stage II Regroup messages eventually reflect this condition. The KNOWN_STAGE_2 variable #_750*b* becomes equal to the KNOWN_STAGE_1 variable #_750*a*.

The processor 2, by hypothesis, still receives the Regroup messages from the processors 1 and 3–5. It eventually receives a Stage II Regroup message wherein the KNOWN_STAGE_1 and _2 variables #_750*a*, #_750*b* are equal and exclude the processor 2. The processor 2 notices this type of Stage II Regroup message and halts.

Processors 1 and 3–5 proceed through the remainder of the regroup operation and form the system N_200'. Now, instead of the IamAlives missing from the processor 2 periodically perturbing the system N_200, the system N_200' excludes the processor 2 altogether. (Also, the processor 2 is dead and therefore harmless.)

Of course, the program text for such software incorporating the invention herein disclosed can exist in its static form on a magnetic, optical or other disk; in ROM, in RAM or in another integrated circuit; on magnetic tape; or in another data storage medium. That data storage medium may be integral to or insertable into a computer system.

What is claimed is:

1. In a multi-processor system having a plurality of processors, each of said plurality of processors having a respective memory, a method for distributively agreeing on processor membership in said multi-processor system, said method comprising:

communicatively coupling said plurality of processors;

then detecting a communications failure;

then attempting to firstly determine on each of said plurality of processors still operating which of said plurality of processors are still operating and still communicatively coupled, thereby determining said each processor's respective view of said multi-processor system;

then secondly determining on said each processor still operating whether said each processor still operating is to continue operations or to halt operations, said second determination based on said each processor's respective view of said multi-processor system;

then continuing or halting operations on said each processor according to said second determination;

collecting connectivity information on a first of said plurality of processors; and then selecting on said first processor certain of said plurality of processors to cease operations, based on said connectivity information collected.

2. In a multi-processor system having a plurality of processors, each of said plurality of processors having a respective memory, a method for distributively agreeing on processor membership in said multi-processor system, said method comprising:

communicatively coupling said plurality of processors;

then detecting a communications failure;

then attempting to firstly determine on each of said plurality of processors still operating which of said plurality of processors are still operating and still communicatively coupled, thereby determining said each processor's respective view of said multi-processor system, including subjecting said each processor to a method including respective advancement from a first to a second stage, initially placing said each processor in said first stage;

then sending status of advancement of one of said plurality of processors;

receiving on a second of said plurality of processors said status of advancement of said one processor;

after said receiving, updating status of said second processor only if notification of a time expiration has occurred on said second processor;

respectively advancing to said second stage each processor which has updated its status;

determining that timer expirations have failed on said second processor when said second processor fails to advance from said first stage and thus that said second processor has effectively ceased to operate; and then secondly determining on said each processor still operating whether said each processor still operating is to continue operations or to halt operations, said second determination based on said each processor's respective view of said multi-processor system;

then continuing or halting operations on said each processor according to said second determination.

3. In a multi-processor system having a plurality of processors each having a respective memory, a method for distributively agreeing on processor membership in said multi-processor system, said method comprising:

communicatively connecting said plurality of processors;

subjecting each of said plurality of processors to a method including respective advancement from a first to a second stage, initially placing said each processor in said first stage;

sending status of advancement of a first of said plurality of processors;

receiving on a second of said plurality of processors said status of advancement of said first processor;

after said receiving, updating status of said second processor only if notification of a time expiration has occurred on said second processor;

respectively advancing to said second stage each processor which has updated its status; and failing to send connectivity information when said second processor fails to advance from said first stage and determining that said second processor has effectively ceased to operate;

collecting connectivity information on a third of said plurality of processors; and selecting on said third processor certain of said plurality of processors to cease operations, based on said connectivity information collected.

4. In a multi-processor system having a plurality of processors, each of said plurality of processors having a respective memory, a method for distributively agreeing on processor membership in said multi-processor system, said method comprising:

communicatively coupling said plurality of processors;

then detecting a communications failure;

then attempting to firstly determine on each of said plurality of processors still operating which of said plurality of processors are still operating and still communicatively coupled, thereby determining said each processor's respective view of said multi-processor system, including subjecting said each processor to a method including respective advancement from a first to a second stage, initially placing said each processor in said first stage;

then sending status of advancement of one of said plurality of processors;

receiving on a second of said plurality of processors said status of advancement of said one processor;

after said receiving, updating status of said second processor only if notification of a time expiration has occurred on said second processor;

respectively advancing to said second stage each processor which has updated its status;

determining that timer expirations have failed on said second processor when said second processor fails to advance from said first stage and thus that said second processor has effectively ceased to operate; and then secondly determining on said each processor still operating whether said each processor still operating is to continue operations or to halt operations, said second determination based on said each processor's respective view of said multi-processor system;

then continuing or halting operations on said each processor according to said second determination;

collecting connectivity information on a third of said plurality of processors; and then selecting on said third processor certain of said plurality of processors to cease operations, based on said connectivity information collected.

* * * * *